United States Patent
Ishikawa et al.

(10) Patent No.: US 11,955,905 B2
(45) Date of Patent: Apr. 9, 2024

(54) POWER CONVERSION APPARATUS AND METHOD FOR DIAGNOSING FAILURE OF POWER CONVERSION APPARATUS

(71) Applicant: HITACHI ASTEMO, LTD., Hitachinaka (JP)

(72) Inventors: Yasuhiro Ishikawa, Hitachinaka (JP); Ryohichi Inada, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 142 days.

(21) Appl. No.: 17/777,344

(22) PCT Filed: Oct. 27, 2020

(86) PCT No.: PCT/JP2020/040168
§ 371 (c)(1),
(2) Date: May 17, 2022

(87) PCT Pub. No.: WO2021/100414
PCT Pub. Date: May 27, 2021

(65) Prior Publication Data
US 2022/0416688 A1 Dec. 29, 2022

(30) Foreign Application Priority Data
Nov. 18, 2019 (JP) ................................. 2019-208207

(51) Int. Cl.
*H02P 27/08* (2006.01)
*H02M 1/00* (2006.01)
(Continued)

(52) U.S. Cl.
CPC ..... *H02M 7/53871* (2013.01); *H02M 1/0009* (2021.05); *H02P 21/22* (2016.02); *H02P 27/08* (2013.01)

(58) Field of Classification Search
CPC .......... H02P 27/08; H02P 21/22; H02P 27/06; H02P 29/024; H02M 1/0009; H02M 7/53871; H02M 7/5395
See application file for complete search history.

(56) References Cited

U.S. PATENT DOCUMENTS

| 8,796,963 B2 * | 8/2014 | Satou ..................... B62D 5/046 318/700 |
| 10,597,071 B2 * | 3/2020 | Takase .................... H02P 27/12 |

(Continued)

FOREIGN PATENT DOCUMENTS

| JP | 2005051839 A | * | 2/2005 |
| JP | 2006-256550 A | | 9/2006 |

(Continued)

OTHER PUBLICATIONS

International Search Report with English Translation and Written Opinion, dated Feb. 9, 2021 (10 pages).

*Primary Examiner* — Thai T Dinh
(74) *Attorney, Agent, or Firm* — Foley & Lardner LLP

(57) ABSTRACT

A three-phase/two-phase conversion unit 43 generates a composite vector $i_{\alpha\beta}$ of three-phase AC currents based on AC currents iu, iv, and iw. An electrical angle calculation unit 44 outputs the electrical angle of the composite vector $i_{\alpha\beta}$ with reference to the U-phase AC current iu. A quadrant calculation unit 45 obtains which quadrant of the first to sixth quadrants partitioned in advance the acquired electrical angle corresponds to, confirms whether the composite vector $i_{\alpha\beta}$ passes through the set quadrant, and outputs quadrant information thereof. A failure detection unit 47 determines whether the composite vector $i_{\alpha\beta}$ has rotated from the first quadrant to the sixth quadrant, and when there is a quadrant that has not been passed, considers that it is a failure state, specifies a failure part of the switching element from the (Continued)

relationship between the electrical angle and the failure part, and outputs failure information to a PWM signal generation unit 42.

14 Claims, 20 Drawing Sheets

(51) Int. Cl.
*H02M 7/5387* (2007.01)
*H02P 21/22* (2016.01)
*H02P 27/06* (2006.01)

(56) References Cited

U.S. PATENT DOCUMENTS

| | | | |
|---|---|---|---|
| 10,840,845 B2 * | 11/2020 | Sato | ................... B60W 50/029 |
| 2012/0176069 A1 | 7/2012 | Sagami et al. | |

FOREIGN PATENT DOCUMENTS

| | | | | |
|---|---|---|---|---|
| JP | 2008-092690 A | 4/2008 | | |
| JP | 4187308 B2 * | 11/2008 | ............. | H02P 21/22 |
| JP | 2009-071975 A | 4/2009 | | |
| JP | 2011-050214 A | 3/2011 | | |
| JP | 2011-061957 A | 3/2011 | | |
| JP | 2011-211839 A | 10/2011 | | |
| JP | 2012-147532 A | 8/2012 | | |
| JP | 2015-142462 A | 8/2015 | | |

\* cited by examiner

FIG. 7

| DETERMINATION AREA | DETERMINATION ANGULAR RANGE ||| FAILURE PART ||||||
| --- | --- | --- | --- | --- | --- | --- | --- | --- | --- |
| | MINIMUM | CENTER | MAXIMUM | U-PHASE UPPER | U-PHASE LOWER | V-PHASE UPPER | V-PHASE LOWER | W-PHASE UPPER | W-PHASE LOWER |
| FIRST QUADRANT | 330 | 0 | 30 | × | ○ | ○ | × | ○ | × |
| SECOND QUADRANT | 30 | 60 | 90 | × | ○ | × | ○ | ○ | × |
| THIRD QUADRANT | 90 | 120 | 150 | ○ | × | × | ○ | ○ | × |
| FOURTH QUADRANT | 150 | 180 | 210 | ○ | × | × | ○ | × | ○ |
| FIFTH QUADRANT | 210 | 240 | 270 | ○ | × | ○ | × | × | ○ |
| SIXTH QUADRANT | 270 | 300 | 330 | × | ○ | ○ | × | × | ○ |

| DETERMINATION AREA | DETERMINATION ANGULAR RANGE | | | FAILURE MISSING ORDER | | | | | |
|---|---|---|---|---|---|---|---|---|---|
| | MINIMUM | CENTER | MAXIMUM | U-PHASE UPPER | U-PHASE LOWER | V-PHASE UPPER | V-PHASE LOWER | W-PHASE UPPER | W-PHASE LOWER |
| FIRST QUADRANT | 330 | 0 | 30 | 2 | - | - | 3 | - | 1 |
| SECOND QUADRANT | 30 | 60 | 90 | 3 | - | 1 | - | - | 2 |
| THIRD QUADRANT | 90 | 120 | 150 | - | 1 | 2 | - | - | 3 |
| FOURTH QUADRANT | 150 | 180 | 210 | - | 2 | 3 | - | 1 | - |
| FIFTH QUADRANT | 210 | 240 | 270 | - | 3 | - | 1 | 2 | - |
| SIXTH QUADRANT | 270 | 300 | 330 | 1 | - | - | 2 | 3 | - |

FIG. 17

| NUMBER IN DRAWING | DETERMINATION AREA | DETERMINATION ANGULAR RANGE | | | FAILURE PART | | | | | |
|---|---|---|---|---|---|---|---|---|---|---|
| | | MINIMUM | CENTER | MAXIMUM | U-PHASE UPPER | U-PHASE LOWER | V-PHASE UPPER | V-PHASE LOWER | W-PHASE UPPER | W-PHASE LOWER |
| 1 | FIRST QUADRANT | 330+α | 0 | 30−α | × | ○ | ○ | × | ○ | × |
| 2 | SECOND QUADRANT | 30+α | 60 | 90−α | × | ○ | × | ○ | ○ | × |
| 3 | THIRD QUADRANT | 90+α | 120 | 150−α | ○ | × | × | ○ | ○ | × |
| 4 | FOURTH QUADRANT | 150+α | 180 | 210−α | ○ | × | × | ○ | × | ○ |
| 5 | FIFTH QUADRANT | 210+α | 240 | 270−α | ○ | × | ○ | × | × | ○ |
| 6 | SIXTH QUADRANT | 270+α | 300 | 330−α | × | ○ | ○ | × | × | ○ |
| 7 | VICINITY OF BOUNDARY | 30−α | 30 | 30+α | INFORMATION OTHER THAN APPLICATION OF FAILURE SPECIFICATION | | | | | |
| | VICINITY OF BOUNDARY | 90−α | 90 | 90+α | | | | | | |
| | VICINITY OF BOUNDARY | 150−α | 150 | 150+α | | | | | | |
| | VICINITY OF BOUNDARY | 210−α | 210 | 210+α | | | | | | |
| | VICINITY OF BOUNDARY | 270−α | 270 | 270+α | | | | | | |
| | VICINITY OF BOUNDARY | 330−α | 330 | 330+α | | | | | | |

FIG. 19

| NUMBER IN DRAWING | DETERMINATION AREA | DETERMINATION ANGULAR RANGE | | | FAILURE PART | | | | | |
|---|---|---|---|---|---|---|---|---|---|---|
| | | MINIMUM | CENTER | MAXIMUM | U-PHASE UPPER | U-PHASE LOWER | V-PHASE UPPER | V-PHASE LOWER | W-PHASE UPPER | W-PHASE LOWER |
| 1 | FIRST QUADRANT | 330+α | 0 | 30−α | × | ○ | ○ | × | ○ | × |
| 2 | SECOND QUADRANT | 30+α | 60 | 90−α | × | ○ | × | ○ | ○ | × |
| 3 | THIRD QUADRANT | 90+α | 120 | 150−α | ○ | × | × | ○ | ○ | × |
| 4 | FOURTH QUADRANT | 150+α | 180 | 210−α | ○ | × | × | ○ | × | ○ |
| 5 | FIFTH QUADRANT | 210+α | 240 | 270−α | × | ○ | ○ | × | × | ○ |
| 6 | SIXTH QUADRANT | 270+α | 300 | 330−α | × | ○ | ○ | × | × | ○ |
| 7 | VICINITY OF BOUNDARY | 30−α | 30 | 30+α | − | − | − | − | ○ | × |
| 8 | VICINITY OF BOUNDARY | 90−α | 90 | 90+α | ○ | × | × | ○ | ○ | × |
| 9 | VICINITY OF BOUNDARY | 150−α | 150 | 150+α | ○ | × | × | ○ | − | − |
| 10 | VICINITY OF BOUNDARY | 210−α | 210 | 210+α | − | − | ○ | × | × | ○ |
| 11 | VICINITY OF BOUNDARY | 270−α | 270 | 270+α | ○ | × | ○ | × | × | ○ |
| 12 | VICINITY OF BOUNDARY | 330−α | 330 | 330+α | × | ○ | × | × | − | − |

FIG. 21

| NUMBER IN DRAWING | DETERMINATION AREA | DETERMINATION ANGULAR RANGE [°] | | | FAILURE PART | | | | | |
|---|---|---|---|---|---|---|---|---|---|---|
| | | MINIMUM | CENTER | MAXIMUM | U-PHASE UPPER | U-PHASE LOWER | V-PHASE UPPER | V-PHASE LOWER | W-PHASE UPPER | W-PHASE LOWER |
| 1 | FIRST QUADRANT | 0 | 30 | 60 | × | ○ | ○ | ○ | ○ | × |
| 2 | SECOND QUADRANT | 60 | 90 | 120 | ○ | ○ | × | ○ | ○ | × |
| 3 | THIRD QUADRANT | 120 | 150 | 180 | ○ | × | × | ○ | ○ | ○ |
| 4 | FOURTH QUADRANT | 180 | 210 | 240 | ○ | × | ○ | ○ | × | ○ |
| 5 | FIFTH QUADRANT | 240 | 270 | 300 | × | ○ | ○ | × | × | ○ |
| 6 | SIXTH QUADRANT | 300 | 330 | 0 | × | ○ | ○ | × | ○ | ○ | ized
POWER CONVERSION APPARATUS AND METHOD FOR DIAGNOSING FAILURE OF POWER CONVERSION APPARATUS

TECHNICAL FIELD

The present invention relates to a power conversion apparatus and a method for diagnosing a failure of the power conversion apparatus.

BACKGROUND ART

A hybrid vehicle or an electric vehicle is equipped with a power conversion apparatus for driving a motor. The power conversion apparatus operates a switching element in an inverter circuit to convert a DC current supplied from a battery into an AC current, and drives a motor with the converted AC current.

In recent years, in order to support functional safety standards for automobiles, it is necessary to perform failure detection of a power conversion apparatus and shift to a safe state after the failure detection. PTL 1 discloses a technique for specifying a failure part in an inverter based on a rotation angle θ of a motor detected by a rotation angle sensor when a zero state of a d-axis current Id or a q-axis current Iq is detected.

CITATION LIST

Patent Literature

PTL 1: JP 2011-50214 A

SUMMARY OF INVENTION

Technical Problem

In the technique described in PTL 1, there is a possibility that a current is erroneously detected near zero.

Solution to Problem

A power conversion apparatus according to the present invention includes: an inverter circuit configured by a switching element and configured to convert a DC current into an AC current; a current detection unit configured to detect three-phase output currents of the inverter circuit; and a control unit that, when an electrical angle of a composite vector calculated from the three-phase output currents detected by the current detection unit is not included in a predetermined range, specifies that an open failure has occurred in a switching element of the inverter circuit in a phase corresponding to the predetermined range.

A method for diagnosing a failure of a power conversion apparatus according to the present invention includes: detecting three-phase output currents of an inverter circuit that is configured by a switching element and configured to convert a DC current into an AC current; specifying, when an electrical angle of a composite vector calculated from the detected three-phase output currents of the three phases is not included in a predetermined range, that an open failure has occurred in a switching element of the inverter circuit in a phase corresponding to the predetermined range.

Advantageous Effects of Invention

According to the present invention, a failure of a switching element can be detected with high accuracy without being affected by the magnitude of the output current of each phase.

BRIEF DESCRIPTION OF DRAWINGS

FIG. 7 is a diagram illustrating a determination table of failure detection in the first embodiment.

FIG. is a diagram illustrating a determination table of failure detection in the third embodiment.

Figure 15:
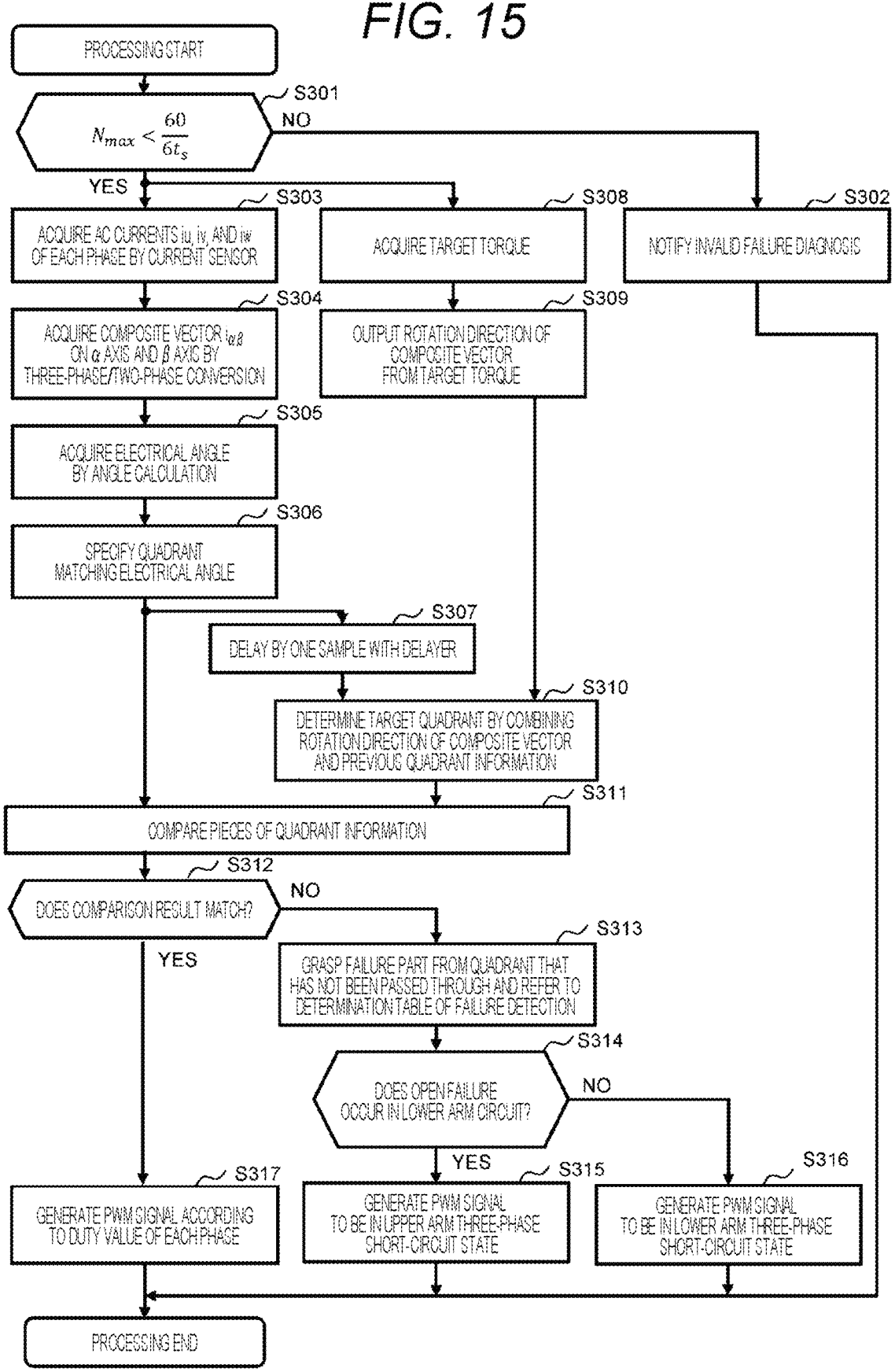

FIG. 15 is a flowchart illustrating an operation of a control unit in the third embodiment.

Figure 16:
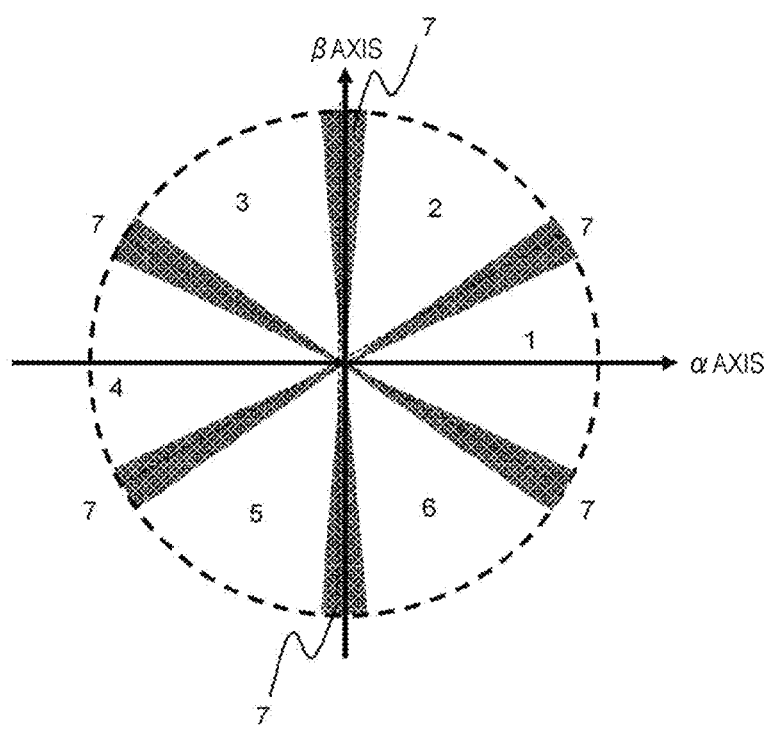

FIG. 16 is a diagram illustrating a quadrant of a composite vector in an αβ-axis coordinate space in Modification 1.

FIG. 17 is a diagram illustrating a determination table of failure detection in Modification 1.

Figure 18:
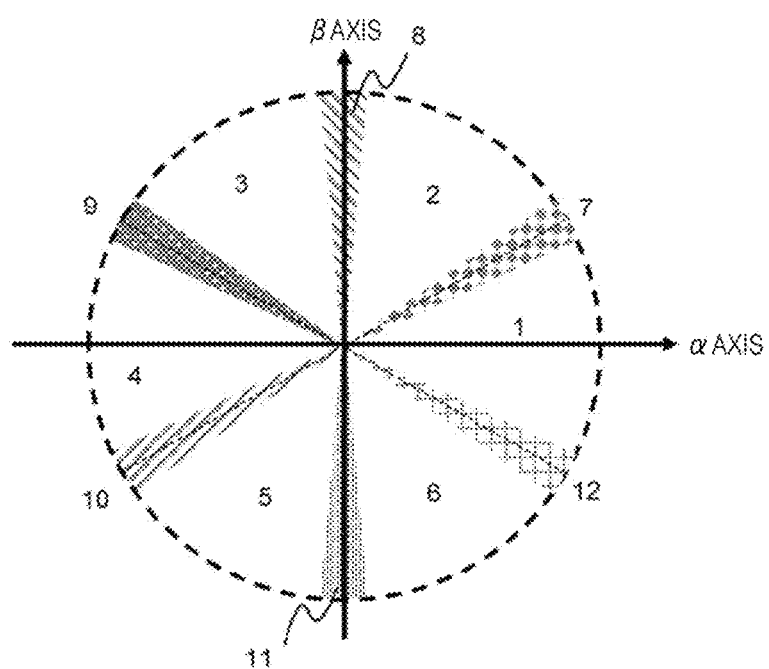

FIG. 18 is a diagram illustrating a quadrant of a composite vector in an αβ-axis coordinate space in Modification 2.

FIG. 19 is a diagram illustrating a determination table of failure detection in Modification 2.

Figure 20:
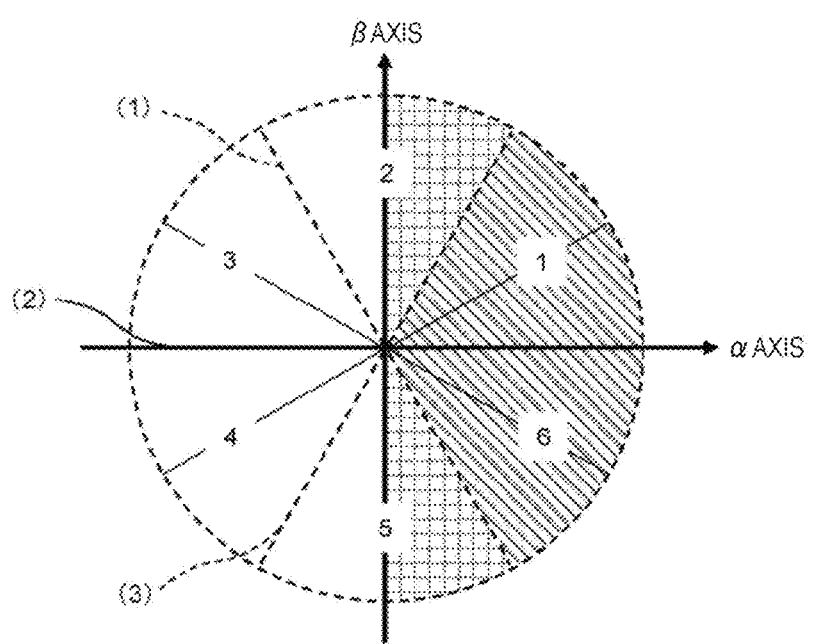

FIG. 20 is a diagram illustrating a quadrant of a composite vector in an αβ-axis coordinate space in Modification 3.

FIG. 21 is a diagram illustrating a determination table of failure detection in Modification 3.

DESCRIPTION OF EMBODIMENTS

First Embodiment

Figure 1:
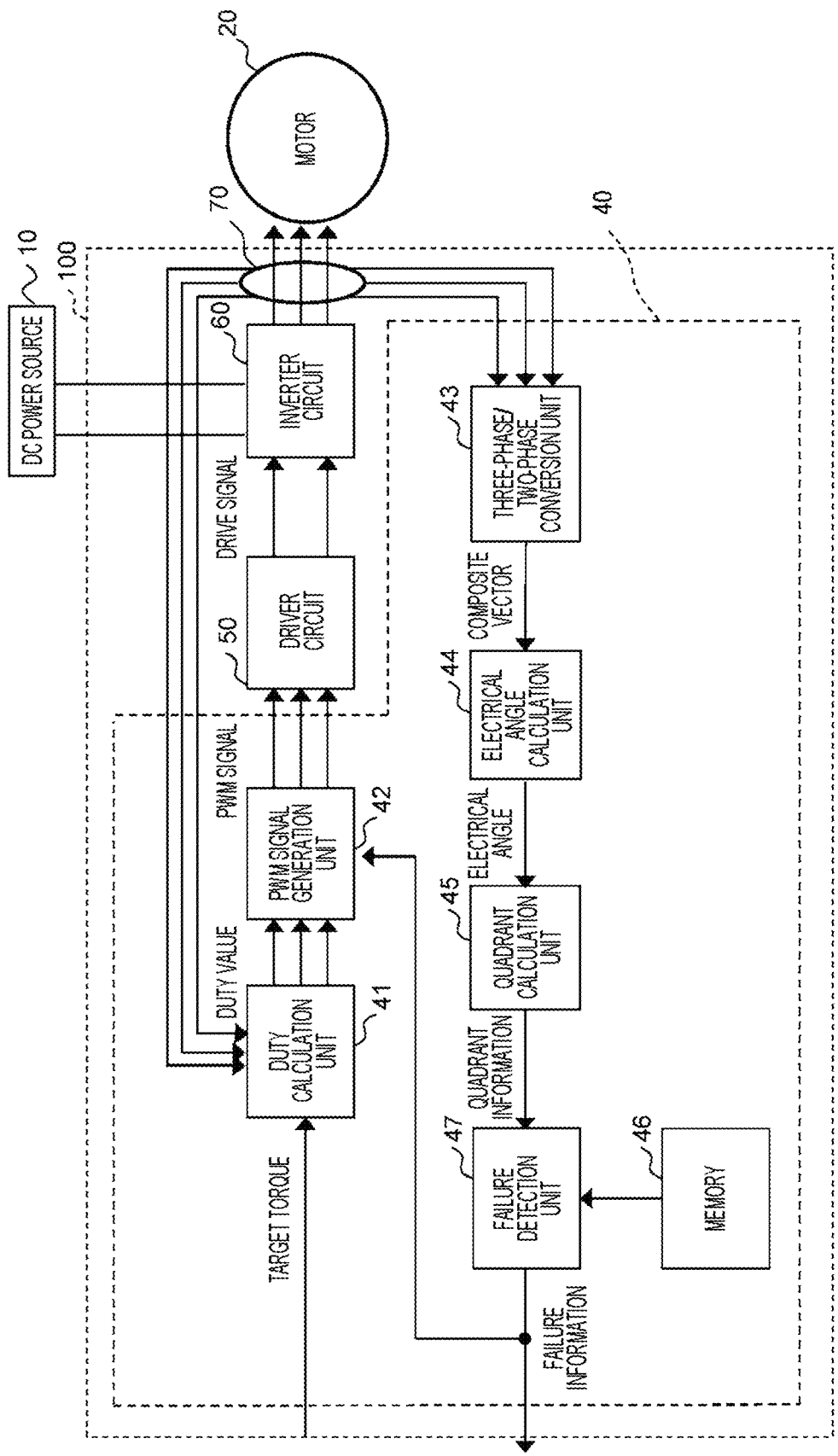
FIG. 1 is a circuit configuration diagram of a power conversion apparatus in a first embodiment.

FIG. 1 is a circuit configuration diagram of a power conversion apparatus 100 in the present embodiment.

The power conversion apparatus 100 converts DC power obtained from a DC power source 10 into AC power to drive a motor 20.

The motor 20 is a three-phase motor having three windings therein. The power conversion apparatus 100 detects a failure to be described later and notifies a host control device of failure information.

The power conversion apparatus 100 includes a control unit 40, a driver circuit 50, an inverter circuit 60, and a current detection unit 70. The control unit 40 includes a duty calculation unit 41, a PWM signal generation unit 42, a three-phase/two-phase conversion unit 43, an electrical angle calculation unit 44, a quadrant calculation unit 45, a memory 46, and a failure detection unit 47.

The current detection unit 70 measures an AC current flowing through each phase (U-phase, V-phase, and W-phase) of the motor 20 using a current sensor or the like. Specifically, an AC current iu flowing through the U phase, an AC current iv flowing through the V phase, and an AC current iw flowing through the W phase are measured and output to the three-phase/two-phase conversion unit 43. In this manner, the current detection unit 70 detects the output current of each phase of the inverter circuit 60.

The control unit 40 communicates with an electronic control device (not illustrated) provided outside the power conversion apparatus 100, receives a target torque of the motor 20 from the external electronic control device, and inputs the target torque to the duty calculation unit 41.

The duty calculation unit 41 obtains a target current value to flow to the motor 20 using the target torque or the like. The target current value is expressed in the form of, for example, a d-axis target current value and a q-axis target current value. Further, the duty calculation unit 41 calculates a U-phase duty value, a V-phase duty value, and a W-phase duty value based on the target current value and the AC currents iu, iv, and iw detected by the current detection unit 70, and outputs the calculated values to the PWM signal generation unit 42.

When the failure information is output from the failure detection unit 47, the PWM signal generation unit controls the PWM signal so that the motor 20 is not driven. Examples of the state in which the motor 20 is not driven include a state in which all the six switching elements in the inverter circuit 60 are turned off (referred to as a freewheel state in the present embodiment). Other examples include a state in which, among the six switching elements, three switching elements of the upper arm circuit are turned on and three switching elements of the lower arm circuit are turned off (referred to as an upper arm active short state in the present embodiment), and conversely, a state in which three switching elements of the upper arm circuit are turned off and three switching elements of the lower arm circuit are turned on (referred to as a lower arm active short state in the present embodiment).

The driver circuit 50 receives the PWM signal output from the PWM signal generation unit 42, and outputs a drive signal for switching ON/OFF of the switching element to the inverter circuit 60.

The inverter circuit 60 includes a smoothing capacitor and six switching elements therein, and converts DC power obtained from the DC power source 10 into AC power to drive the motor 20 during power running. At the time of regeneration, the power of the motor 20 is converted into DC power to charge the DC power source 10.

The three-phase/two-phase conversion unit 43 generates a composite vector $i_{\alpha\beta}$ of three-phase AC currents based on the AC currents iu, iv, and iw.

The electrical angle calculation unit 44 outputs a vector angle (hereinafter, referred to as an electrical angle) of the composite vector $i_{\alpha\beta}$ with reference to the U-phase AC current iu.

The quadrant calculation unit 45 obtains which quadrant of a first quadrant to a sixth quadrant partitioned in advance the acquired electrical angle corresponds to, confirms the quadrant through which the composite vector $i_{\alpha\beta}$ has passed, and outputs quadrant information.

The memory 46 stores a determination table to be described later.

The failure detection unit 47 determines whether the composite vector $i_{\alpha\beta}$ has rotated from the first quadrant to the sixth quadrant by one electrical angle. Then, when there is a quadrant that has not been passed, the failure detection unit 47 considers that it is a failure state, specifies a failure part of the switching element from the relationship between the electrical angle and the failure part with reference to the determination table in the memory 46, and outputs failure information to the host control device and the PWM signal generation unit 42.

Details of the three-phase/two-phase conversion unit 43, the electrical angle calculation unit 44, the quadrant calculation unit 45, the memory 46, and the failure detection unit 47 will be described later.

Note that each configuration in the control unit 40 may implement the function of each configuration by a CPU and a program represented by a flowchart illustrated in FIG. 8 to be described later, regardless of the configuration by hardware. In a case where each configuration in the control unit 40 is realized by the CPU and the program, there is an advantage that the cost can be reduced because the number of pieces of hardware is reduced. On the other hand, in a case where each configuration is configured by hardware independent of the control unit 40, there is an advantage that the processing load of the control unit 40 is reduced and the diagnosis processing can be speeded up.

Figure 2:
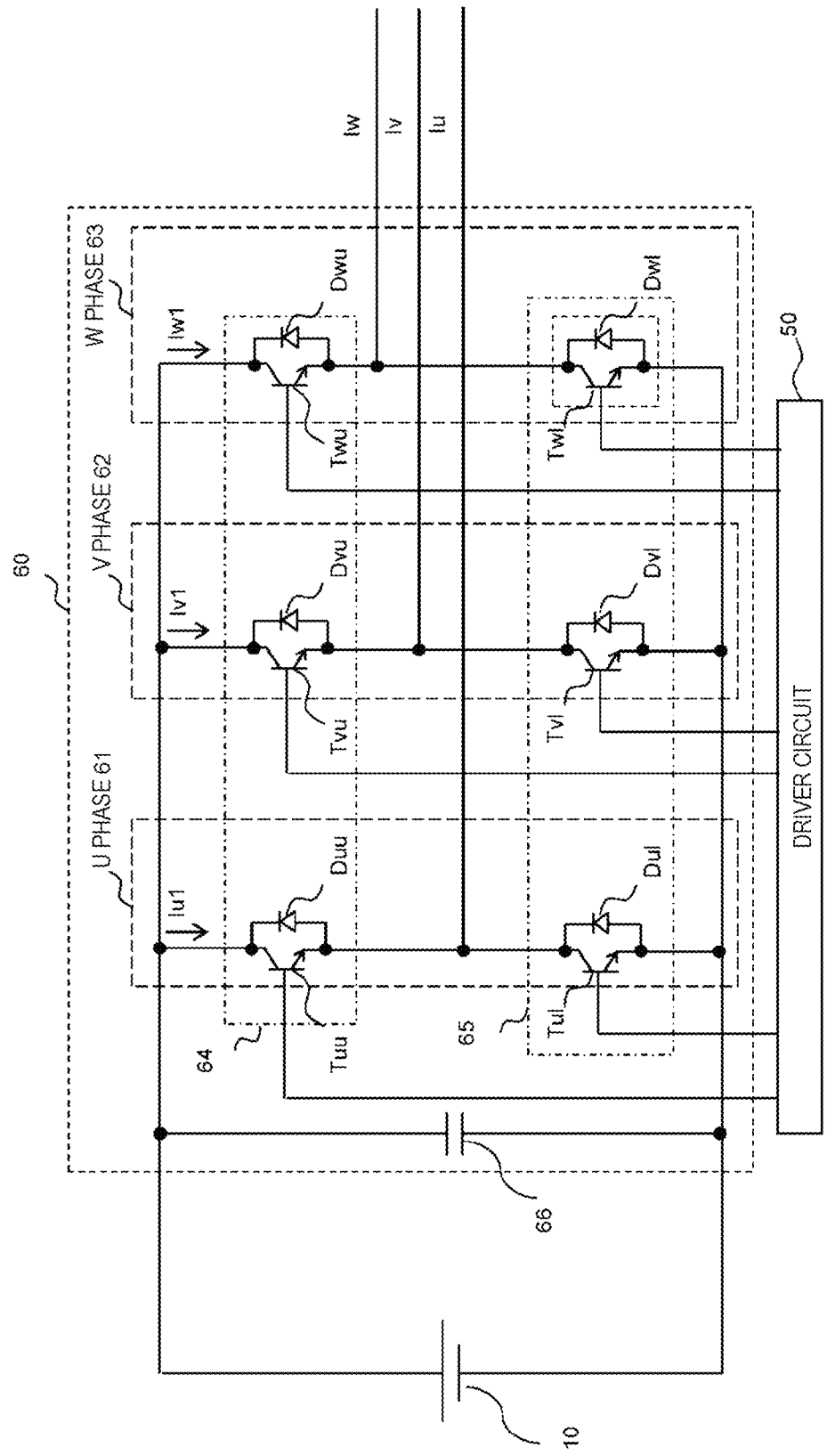
FIG. 2 is a circuit configuration diagram of an inverter circuit.

FIG. 2 is a circuit configuration diagram of the inverter circuit 60.

The inverter circuit 60 has UVW-phase upper and lower arm series circuits. A U-phase upper and lower arm series circuit 61 includes a U-phase upper arm switching element Tuu, a U-phase upper arm diode Duu, a U-phase lower arm switching element Tul, and a U-phase lower arm diode Dul. A V-phase upper and lower arm series circuit 62 includes a V-phase upper arm switching element Tvu and a V-phase upper arm diode Dvu, and a V-phase lower arm switching element Tvl and a V-phase lower arm diode Dvl. A W-phase upper and lower arm series circuit 63 includes a W-phase upper arm switching element Twu, a W-phase upper arm diode Dwu, a W-phase lower arm switching element Twl, and a W-phase lower arm diode Dwl.

An upper arm circuit 64 includes the U-phase upper arm switching element Tuu and the U-phase upper arm diode Duu, the V-phase upper arm switching element Tvu and the V-phase upper arm diode Dvu, and the W-phase upper arm switching element Twu and the W-phase upper arm diode Dwu. A lower arm circuit 65 includes the U-phase lower arm switching element Tul and the U-phase lower arm diode Dul, the V-phase lower arm switching element Tvl and the V-phase lower arm diode Dvl, and the W-phase lower arm switching element Twl and the W-phase lower arm diode Dwl. The switching element is, for example, a power metal oxide semiconductor field effect transistor (power MOSFET) or an insulated gate bipolar transistor (IGBT).

A smoothing capacitor 66 smooths the current generated by ON/OFF of the switching element and suppresses the ripple of the DC current supplied from the DC power source 10 to the inverter circuit 60. As the smoothing capacitor 66, for example, an electrolytic capacitor or a film capacitor is used.

Figure 3:
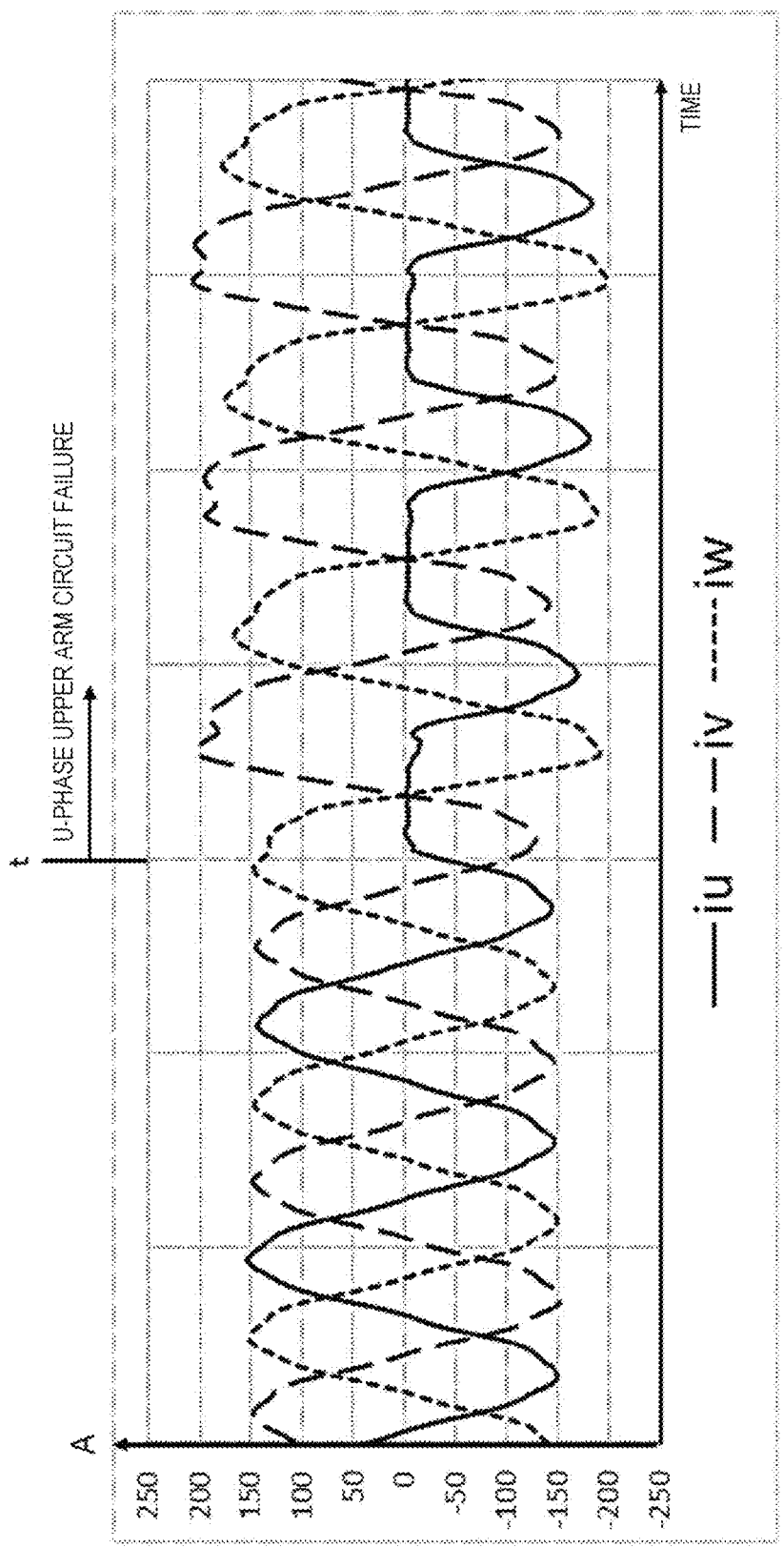
FIG. 3 is a graph illustrating AC currents iu, iv, and iw detected by a current detection unit.

FIG. 3 is a graph illustrating the AC currents iu, iv, and iw detected by the current detection unit 70.

In FIG. 3, the horizontal axis represents time, and the vertical axis represents a current value (amperes). The U-phase AC current iu is indicated by a solid line, the V-phase AC current iv is indicated by a long dotted line, and the W-phase AC current iw is indicated by a short dotted line. FIG. 3 illustrates a case where the U-phase upper arm circuit fails at time t.

As illustrated before time t in FIG. 3, when each switching element of the inverter circuit 60 is normal, AC waveforms in which phases of the AC currents iu, iv, and iw are shifted by 120° is drawn. When the U-phase upper arm switching element Tuu has an open failure at time t, the current that should have flowed through the switching element Tuu is disconnected, so that the upper half of the U-phase AC current iu is missing.

Figure 4:
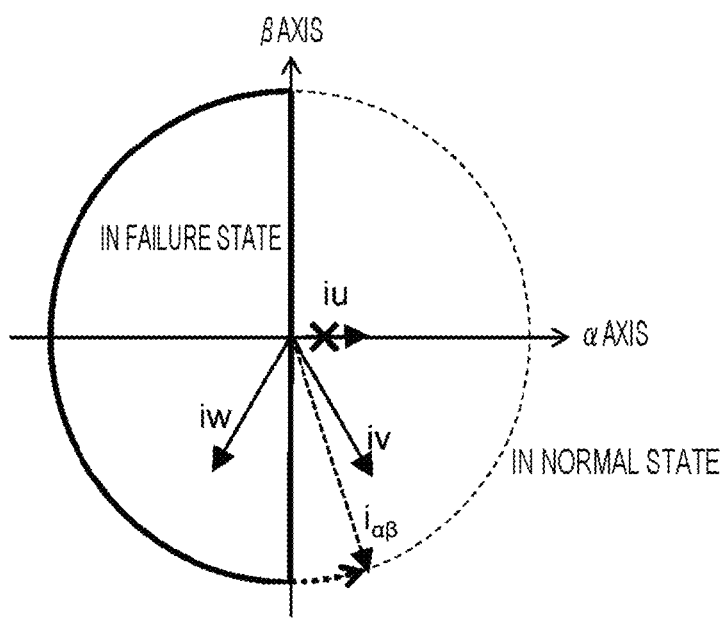
FIG. 4 is a diagram illustrating a rotation locus of a composite vector $i_{\alpha\beta}$ in a case where an open failure occurs in a U-phase upper arm circuit.

FIG. 4 is a diagram illustrating a rotation locus of the composite vector $i_{\alpha\beta}$ in a case where an open failure occurs in the U-phase upper arm circuit. The rotation locus of the composite vector $i_{\alpha\beta}$ when the open failure occurs in the U-phase upper arm circuit becomes a semicircle on the left side as indicated by the solid line in FIG. 4. On the other hand, when there is no failure, a circle is formed as indicated by a dotted line in FIG. 4.

The three-phase/two-phase conversion unit 43 obtains the composite vector $i_{\alpha\beta}$ of the three-phase currents which are the AC currents iu, iv, and iw with the positive direction of the U-phase current iu (here, the direction from the inverter circuit 60 to the motor 20) set to 0°. In general, this operation is called three-phase/two-phase conversion, and the conversion result is expressed on an α axis and a β axis. A positive direction of the U-phase current iu is defined as an α axis, and an axis orthogonal to the α axis is defined as a β axis.

In the normal state, the composite vector $i_{\alpha\beta}$ of the three-phase currents rotates so as to draw a circle. However, when an open failure occurs in the U-phase upper arm circuit, a right-side component of the circle does not occur in the composite vector $i_{\alpha\beta}$, and thus the rotation locus thereof becomes a semicircle on the left side.

The composite vector $i_{\alpha\beta}$ generated by the three-phase/two-phase conversion unit 43 will be described. Based on the U-phase current iu, the three-phase AC currents iu, iv, and iw are expressed by the following Expressions (1) to (3).

[Math. 1]
$$i_u = A_u e^{j\theta} \quad (1)$$

[Math. 2]
$$i_v = A_v e^{j\left(\theta - \frac{2}{3}\pi\right)} \quad (2)$$

[Math. 3]
$$i_w = A_w e^{j\left(\theta + \frac{2}{3}\pi\right)} \quad (3)$$

Here, Au, Av, and Aw are absolute values of AC currents of the U phase, the V phase, and the W phase, respectively.

According to the Euler's formula, for example, the U phase can be component-decomposed into the following Expression (4).

[Math. 4]
$$i_u = A_u(\cos\theta + j\sin\theta) \quad (4)$$

In addition, the U-phase reference vector transformation matrix is expressed by the following Expression (5).

[Math. 5]
$$c = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \quad (5)$$

Therefore, in three-phase currents, two-phase components $i_\alpha$ and $i_\beta$ on the α axis and β axis are obtained by the following conversion Expression (6).

[Math. 6]
$$\begin{bmatrix} i_\alpha \\ i_\beta \end{bmatrix} = C \begin{bmatrix} i_u \\ i_v \\ i_w \end{bmatrix} \quad (6)$$

In the present embodiment, attention is paid to the fact that the generation result of the composite vector $i_{\alpha\beta}$ differs depending on the part of the switching element in which the open failure occurs.

Figure 5:
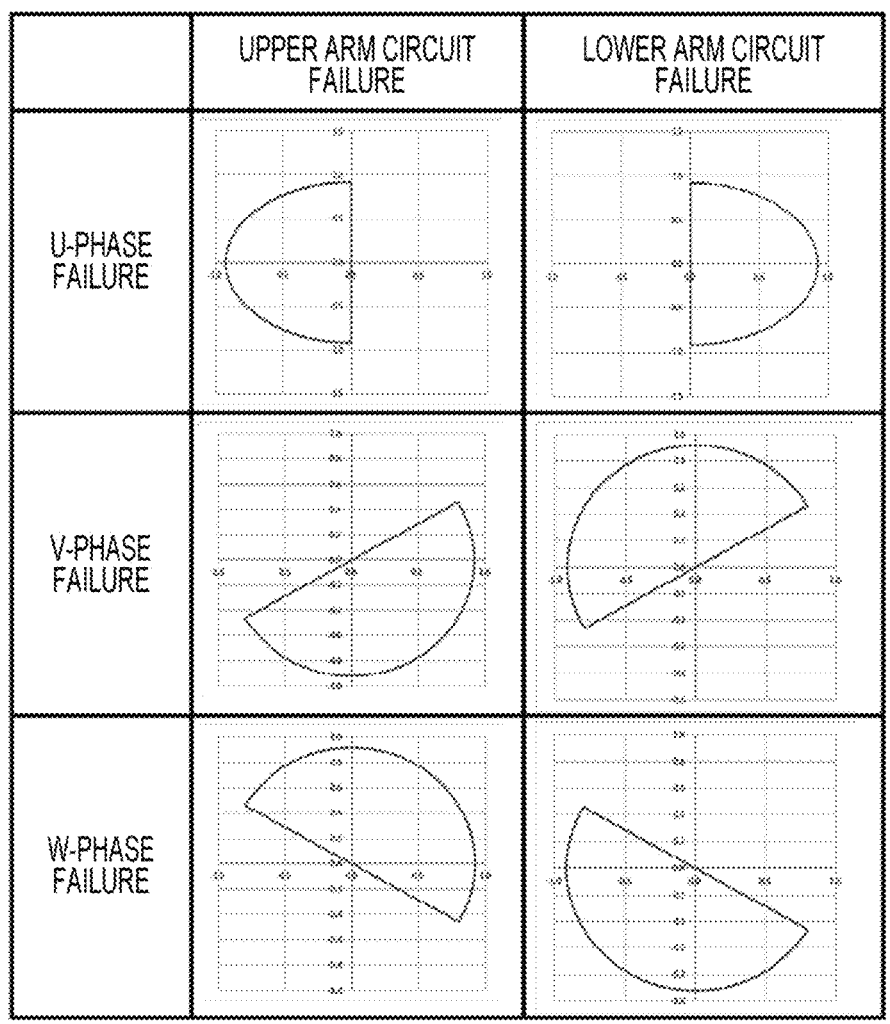
FIG. 5 is a table for explaining a relationship between a failure part of a switching element and the composite vector $i_{\alpha\beta}$.

FIG. 5 is a table for explaining a relationship between a failure part of the switching element and the composite vector $i_{\alpha\beta}$.

As illustrated in FIG. 5, when the U-phase upper arm circuit fails, the composite vector $i_{\alpha\beta}$ becomes a semicircle on the left side. When the V-phase upper arm circuit fails, the composite vector $i_{\alpha\beta}$ becomes a semicircle on the lower right side. When the W-phase upper arm circuit fails, the composite vector $i_{\alpha\beta}$ becomes a semicircle on the upper right side.

In addition, when the U-phase lower arm circuit fails, the composite vector $i_{\alpha\beta}$ becomes a semicircle on the right side. When the V-phase lower arm circuit fails, the composite vector $i_{\alpha\beta}$ becomes a semicircle on the upper left side. When the W-phase lower arm circuit fails, the composite vector $i_{\alpha\beta}$ becomes a semicircle on the lower left side.

As a result, since the portion where the composite vector $i_{\alpha\beta}$ lacks differs depending on the failure part, the αβ-axis plane is divided into six quadrants, and the failure phase of the switching element and the upper arm circuit or the lower arm circuit can be determined by detecting the missing quadrant and the angle at which the composite vector $i_{\alpha\beta}$ advances.

Next, calculation of the electrical angle in the electrical angle calculation unit 44 will be described. From the result of converting the three-phase AC currents iu, iv, and iw into two-phase components $i_\alpha$ and $i_\beta$ on the α axis and the β axis, the electrical angle $\theta_{\alpha\beta}$ on the α axis and the β axis of the composite vector $i_{\alpha\beta}$ is calculated by the following Expression (7).

[Math. 7]
$$\theta_{\alpha\beta} = \tan^{-1}\frac{i_\beta}{i_\alpha} \quad (7)$$

As an example of a method of realizing the electrical angle calculation, a map of the relationship between $i_\alpha$ and $i_\beta$ and the electrical angle $\theta_{\alpha\beta}$ with a current value having a value width corresponding to mounting accuracy is stored by a calculator or a memory, and the electrical angle $\theta_{\alpha\beta}$ is output. When each switching element of the inverter circuit 60 is normal, the electrical angle $\theta_{\alpha\beta}$ rotates about the intersection of the α-axis and the β-axis.

Figure 6:
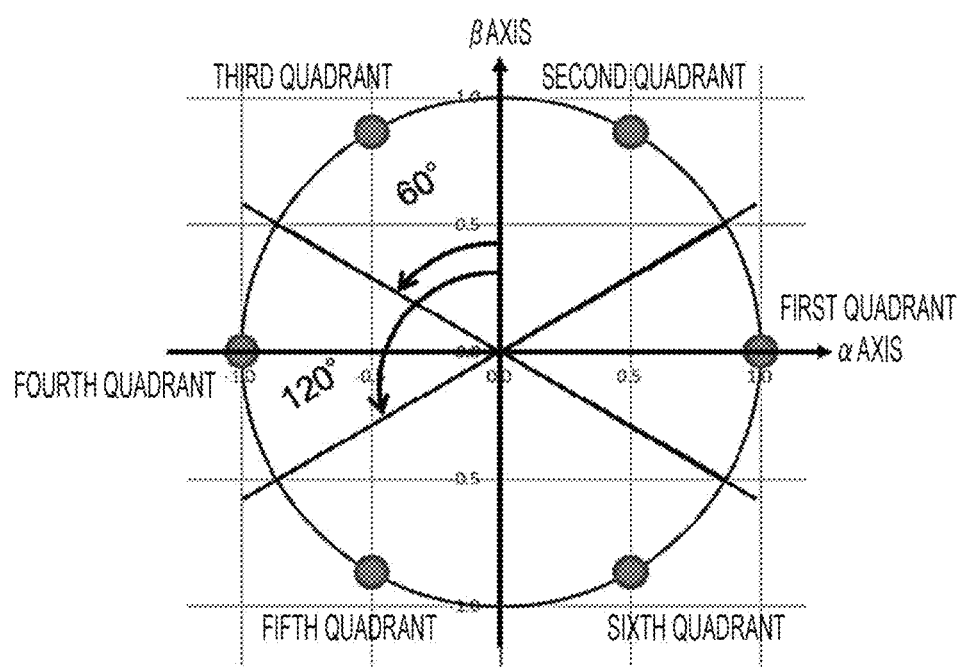
FIG. 6 is a diagram illustrating six quadrants of a composite vector in an αβ-axis coordinate space.

FIG. 6 is a diagram illustrating six quadrants of the composite vector in the αβ-axis coordinate space.

As illustrated in FIG. 6, the quadrant calculation unit 45 partitions a predetermined quadrant in the αβ-axis coordinate space into a first to sixth quadrants by, for example, (1) the β axis, (2) a straight line inclined by 60° with respect to the β axis, and (3) a straight line inclined by 120° with respect to the β axis. Then, when the quadrants are partitioned in this way, each quadrant has an angular range of 60°, and the quadrant calculation unit 45 obtains which quadrant the acquired electrical angle corresponds to, confirms whether the composite vector $i_{\alpha\beta}$ has passed through each partitioned quadrant, and outputs the quadrant information.

FIG. 7 is a diagram illustrating a determination table of failure detection according to the present embodiment.

The determination table illustrated in FIG. 7 is stored in advance in the memory 46. As illustrated in FIG. 7, the determination angular range and the failure part are stored in association with the determination areas from the first quadrant to the sixth quadrant. In the determination table illustrated in FIG. 7, a circle mark indicates a quadrant through which the composite vector passes, and a cross mark indicates a quadrant through which the composite vector does not pass at the failure part.

The determination angular range in the first quadrant has a center of 0 degrees, a minimum of 330 degrees, and a maximum of 30 degrees. When the failure part is the U-phase upper arm circuit, the V-phase lower arm circuit, or the W-phase lower arm circuit, a cross mark indicates that the composite vector $i_{\alpha\beta}$ does not pass through the first quadrant.

The determination angular range in the second quadrant has a center of 60 degrees, a minimum of 30 degrees, and a maximum of 90 degrees. When the failure part is the U-phase upper arm circuit, the V-phase upper arm circuit, or the W-phase lower arm circuit, a cross mark indicates that the composite vector $i_{\alpha\beta}$ does not pass through the second quadrant.

The determination angular range in the third quadrant has a center of 120 degrees, a minimum of 90 degrees, and a maximum of 150 degrees. When the failure part is the U-phase lower arm circuit, the V-phase upper arm circuit, or the W-phase lower arm circuit, a cross mark indicates that the composite vector $i_{\alpha\beta}$ does not pass through the third quadrant.

The determination angular range in the fourth quadrant has a center of 180 degrees, a minimum of 150 degrees, and a maximum of 210 degrees. When the failure part is the U-phase lower arm circuit, the V-phase upper arm circuit, or the W-phase upper arm circuit, a cross mark indicates that the composite vector $i_{\alpha\beta}$ does not pass through the fourth quadrant.

The determination angular range in the fifth quadrant has a center of 240 degrees, a minimum of 210 degrees, and a maximum of 270 degrees. When the failure part is the U-phase lower arm circuit, the V-phase lower arm circuit, or the W-phase upper arm circuit, a cross mark indicates that the composite vector $i_{\alpha\beta}$ does not pass through the fifth quadrant.

The determination angular range in the sixth quadrant has a center of 300 degrees, a minimum of 270 degrees, and a maximum of 330 degrees. When the failure part is the U-phase upper arm circuit, the V-phase lower arm circuit, or the W-phase upper arm circuit, a cross mark indicates that the composite vector $i_{\alpha\beta}$ does not pass through the sixth quadrant.

The failure detection unit 47 determines whether the composite vector has rotated from the first quadrant to the sixth quadrant by one electrical angle. Then, when there is a quadrant that has not been passed on the basis of the quadrant information from the quadrant calculation unit 45, the failure detection unit 47 considers that it is a failure state, specifies a failure part on the basis of the determination table in the memory 46, and outputs the failure information.

Figure 8:
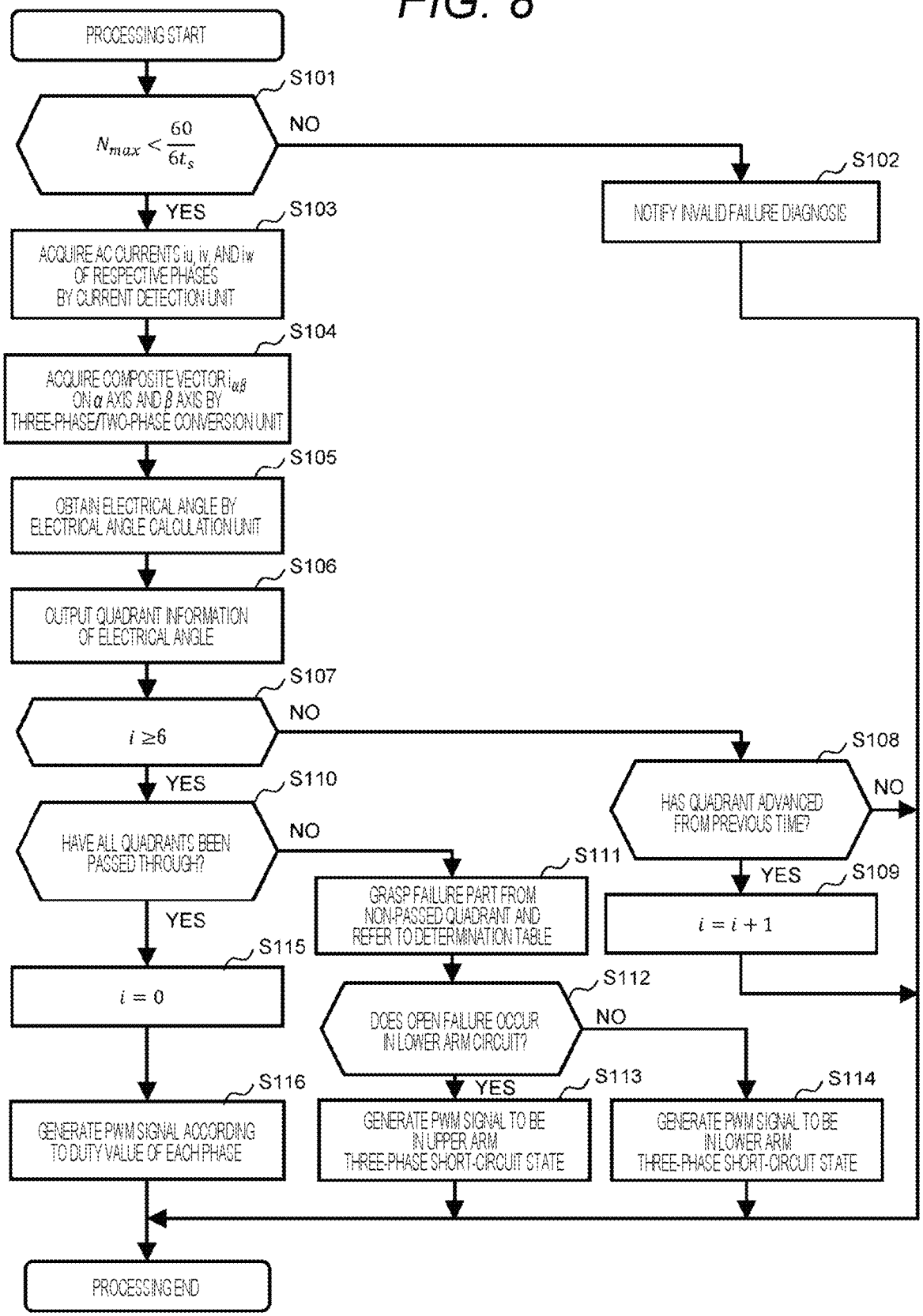
FIG. 8 is a flowchart illustrating an operation of a control unit in the first embodiment.

FIG. 8 is a flowchart illustrating an operation of the control unit 40.

In Step S101 of FIG. 8, it is determined whether a maximum motor rotation speed Nmax [rpm] is less than 60/6 ts. Here, ts is a sampling time for acquiring a current value. When the maximum motor rotation speed Nmax [rpm] does not satisfy the condition shown in Step S101, since the rotation speed of the motor 20 is too high, the process proceeds to Step S102 to notify the host control device that the failure diagnosis is not valid.

The sampling time for acquiring the current value in the current detection unit 70 is approximately determined by the performance of an analog-to-digital converter (ADC) included in the arithmetic unit (microcomputer) of the control unit 40. During one electrical angle rotation, the number of samplings is smallest when the motor rotation speed is maximum.

For example, when the sampling time ts [sec] of the ADC is 100 [us], a motor rotation speed N [rpm] at which only six points can be acquired is a numerical value shown by the following Expression (8).

[Math. 8]

$$N = \frac{60}{100 \times 10^{-6} \times 6} = 100000 \tag{8}$$

The sampling time ts and the maximum motor rotation speed Nmax [rpm] are stored in a memory (not illustrated) in the control unit 40 to check whether the detection by the current detection unit 70 and the control unit 40 is a valid mounting condition.

When the maximum motor rotation speed Nmax [rpm] satisfies the condition shown in Step S101, a minimum of 6 points can be obtained when the rotation speed of the motor makes one electrical angle rotation. That is, the current detection unit 70 and the control unit 40 perform current detection in a sampling period that is at least six points or more the fundamental wave component of the output current during a period of one cycle. In other words, the current detection unit 70 and the control unit 40 perform current detection at a sampling frequency that is at least 6 times or more the frequency of the output current. When the condition shown in Step S101 is satisfied, the process proceeds to Step S103.

In Step S103, the current detection unit 70 acquires the AC currents iu, iv, and iw of the respective phases.

In the next Step S104, the three-phase/two-phase conversion unit 43 acquires the composite vector $i_{\alpha\beta}$ on the α axis and the β axis.

In the next Step S105, the electrical angle calculation unit 44 obtains the electrical angle of the composite vector $i_{\alpha\beta}$ with reference to the U-phase AC current iu. Then, in Step S106, the quadrant calculation unit 45 outputs quadrant information indicating which quadrant of the first quadrant to the sixth quadrant partitioned in advance the acquired electrical angle corresponds to.

In Step S107, it is determined whether i is 6 or more. i is the number of acquired quadrants.

If i is not 6 or more, it is a case where the acquisition has not been completed up to the sixth quadrant, and the process proceeds to Step S108.

In Step S108, it is determined whether the quadrant has advanced from the previous time. When the quadrant is not advanced, the process is ended, and the processing illustrated in FIG. 8 is executed from Step S101 at the next sampling time $t_s$. If the quadrant has advanced from the previous time in Step S108, 1 is added to i in Step S109, and the process is ended.

In a case where it is determined in Step S107 that the acquisition has been completed up to the sixth quadrant, the process proceeds to Step S110. In Step S110, the failure detection unit 47 determines whether the quadrant information output in Step S106 corresponds to all the quadrants, that is, whether the quadrant information passes through all the quadrants. If all the quadrants have not been passed, the process proceeds to Step S111.

In Step S111, the failure detection unit 47 considers that it is a failure state, specifies a failure part with reference to the determination table in the memory 46 and the quadrant that has not been passed, and outputs failure information to the host control device and the PWM signal generation unit 42.

In Step S112, it is determined whether the open failure occurs in the lower arm circuit. In a case where the open failure occurs in the lower arm circuit, in Step S113, the PWM signal generation unit 42 generates and outputs a PWM signal to be in the upper arm three-phase short-circuit state. As a result, the inverter circuit 60 enters an upper arm active short state.

On the other hand, in a case where the open failure occurs in the upper arm circuit in Step S112, the PWM signal generation unit 42 generates and outputs a PWM signal to be in the lower arm three-phase short-circuit state in Step S114. As a result, the inverter circuit 60 enters a lower arm active short state.

After the processing of Steps S113 and S114, the process illustrated in FIG. 8 is ended.

When it is determined in Step S110 that the quadrant information output in Step S106 has passed through all the quadrants, the failure detection unit 47 determines that the inverter circuit 60 is normal and the process proceeds to Step S115. In Step S115, i, which is the number of acquired quadrants, is returned to 0. Then, in Step S116, the PWM signal generation unit 42 generates a PWM signal according to the duty value of each phase. Thereafter, after a predetermined time, the processes from Step S101 in FIG. 8 are repeated.

In this way, in order to determine the state of the presence or absence of the failure of the switching element, it is necessary to indicate that all the quadrants from the first quadrant to the sixth quadrant on the αβ-axis coordinate have been passed. That is, it is necessary to obtain at least six sampling points at one electrical angle rotation, and the sampling time according to the acquisition of the three-phase current value is also obtained. That is, since it is necessary to obtain information of six quadrants instead of simply acquiring six samples at specific points on the αβ-axis coordinate, three-phase current values are acquired at a sampling frequency that is six times or more the electrical angular frequency.

According to the present embodiment, in order to detect the failure using the electrical angle, it is possible to detect the failure of the switching element with high accuracy using only the current value of the three-phase AC current regardless of the amplitude accuracy of the three-phase AC current value.

In addition, when the αβ-axis plane is divided into six quadrants, a failure is detected using passage confirmation information of the quadrants. Therefore, if six samples of electrical angles can be obtained per one rotation of the motor, a failure can be detected within one rotation of the motor without obtaining an AC current value for several cycles.

In addition, in order to obtain higher reliability with respect to failure detection, determination may be made with the results of a plurality of rotations without determining whether the result of one rotation of the electrical angle is normal or failed.

Note that, although the case where the electrical angle is left rotation has been described, the present invention can be applied with the same idea even when the direction in which the three-phase current flows is right rotation as in regeneration.

Since the present embodiment does not require a rotation sensor such as a resolver and uses only the value of the current detection unit 70 such as a current sensor, the type of the electric motor is applicable regardless of the synchronous machine and the induction machine.

Second Embodiment

Figure 9:
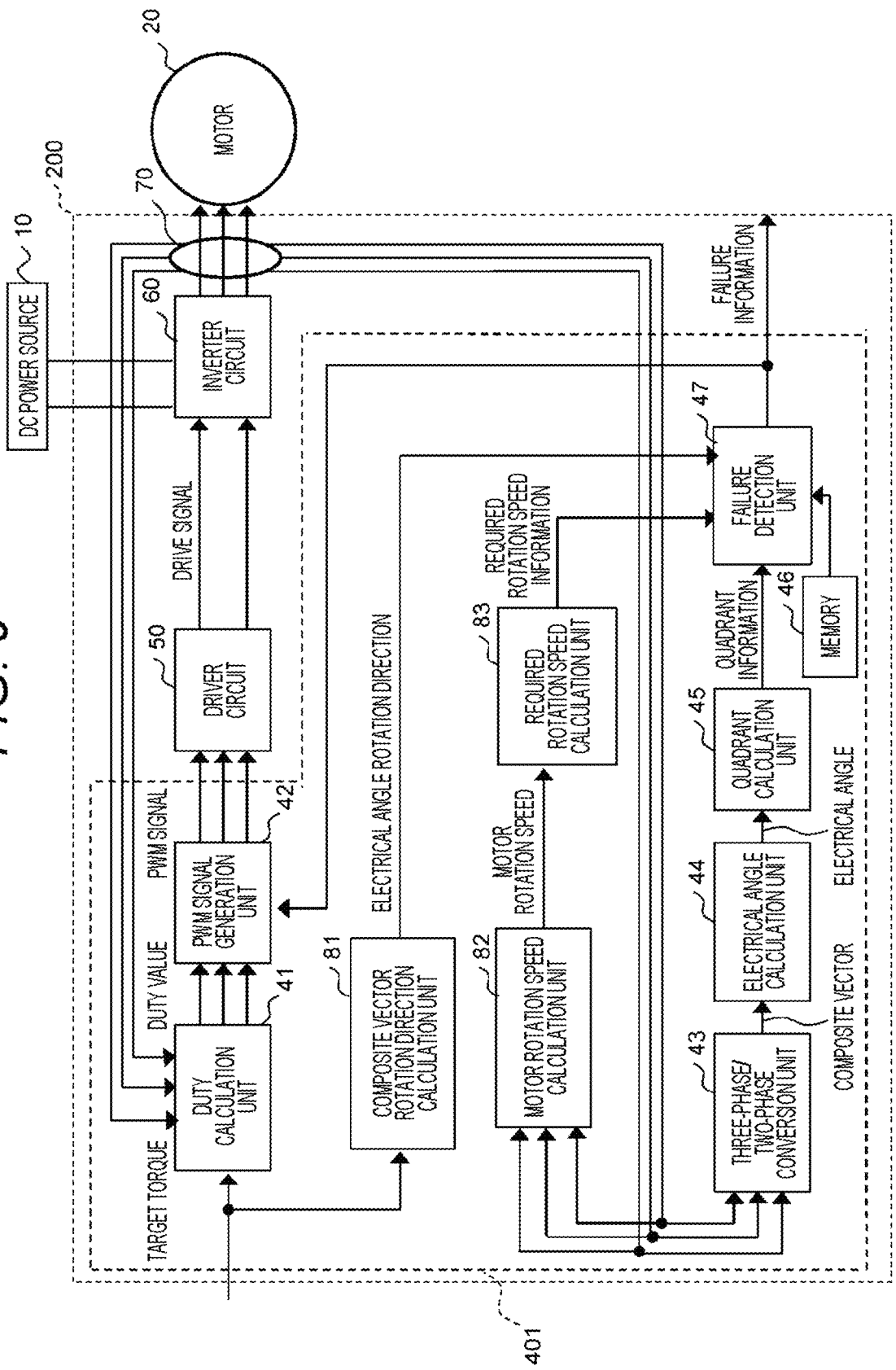
FIG. 9 is a circuit configuration diagram of a power conversion apparatus according to a second embodiment.

FIG. 9 is a circuit configuration diagram of a power conversion apparatus 200 in the present embodiment.

The same portions as those of the power conversion apparatus 100 in the first embodiment illustrated in FIG. 1 are denoted by the same reference numerals, and the description thereof will be omitted.

A control unit 40' includes a composite vector rotation direction calculation unit 81, a motor rotation speed calculation unit 82, and a required rotation speed calculation unit 83 in addition to the duty calculation unit 41, the PWM signal generation unit 42, the three-phase/two-phase conversion unit 43, the electrical angle calculation unit 44, the quadrant calculation unit 45, the memory 46, and the failure detection unit 47.

The composite vector rotation direction calculation unit 81 acquires the target torque of the motor 20 from an electronic control device (not illustrated) provided outside the power conversion apparatus 200, calculates the rotation direction of the composite vector from the target torque, and outputs the rotation direction to the failure detection unit 47.

The motor rotation speed calculation unit 82 calculates the motor rotation speed N from the three-phase AC currents iu, iv, and iw, and outputs the motor rotation speed N to the required rotation speed calculation unit 83.

The required rotation speed calculation unit 83 stores in advance a correspondence table of the motor rotation speed N, the sampling time Ts of the current sensor, and the electrical angle rotation speed necessary for checking passage through all quadrants, and outputs the corresponding electrical angle rotation speed Nr from the motor rotation speed N based on the calculation result of the motor rotation speed calculation unit 82 with reference to the correspondence table.

Note that each component in the control unit 40' may implement the function of each component by a CPU and a program represented by a flowchart illustrated in FIG. 11 to be described later, regardless of the configuration by hardware. In a case where each configuration in the control unit 40' is realized by the CPU and the program, there is an advantage that the cost can be reduced because the number of pieces of hardware is reduced. On the other hand, in a case where each configuration is configured by hardware independent of the control unit 40', there is an advantage that the processing load of the control unit 40' is reduced and the diagnosis processing can be speeded up.

In the present embodiment, three-phase current values are acquired for one or more rotations of the motor 20, and a failure of a switching element in the inverter circuit 60 is detected using quadrant passage information for one or more rotations.

From the relationship between the acquisition timing of the three-phase current value and the rotation speed of the motor 20, there is a case where it is difficult to acquire the electrical angle of the composite vector such that the composite vector passes through all quadrants within one electrical angle rotation. For example, under the condition that the data is acquired at every electrical angle of 103°, the motor 20 passes through all 6 quadrants at slightly more than about 2 rotations.

Figure 10:
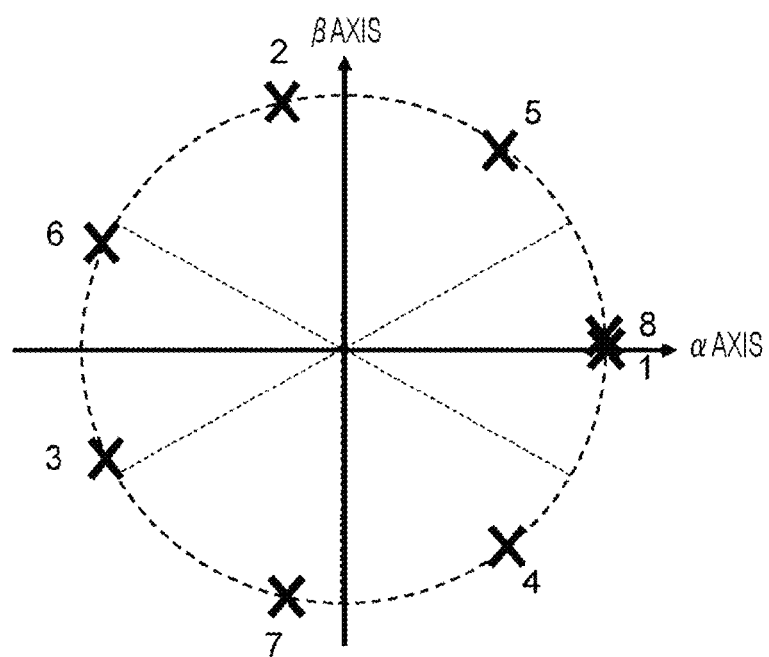
FIG. 10 is a diagram illustrating acquisition timing of three-phase current values in an αβ-axis coordinate space in the second embodiment.

FIG. 10 is a diagram illustrating acquisition timing of three-phase current values in the αβ-axis coordinate space.

The cross mark illustrated in FIG. 10 indicates the acquisition timing of the three-phase current value, and the number indicates the acquisition order. In FIG. 10, data is acquired every electrical angle of 103°, and quadrant information corresponding to six quadrants is obtained at slightly more than about 2 rotations of the motor 20.

Figure 11:
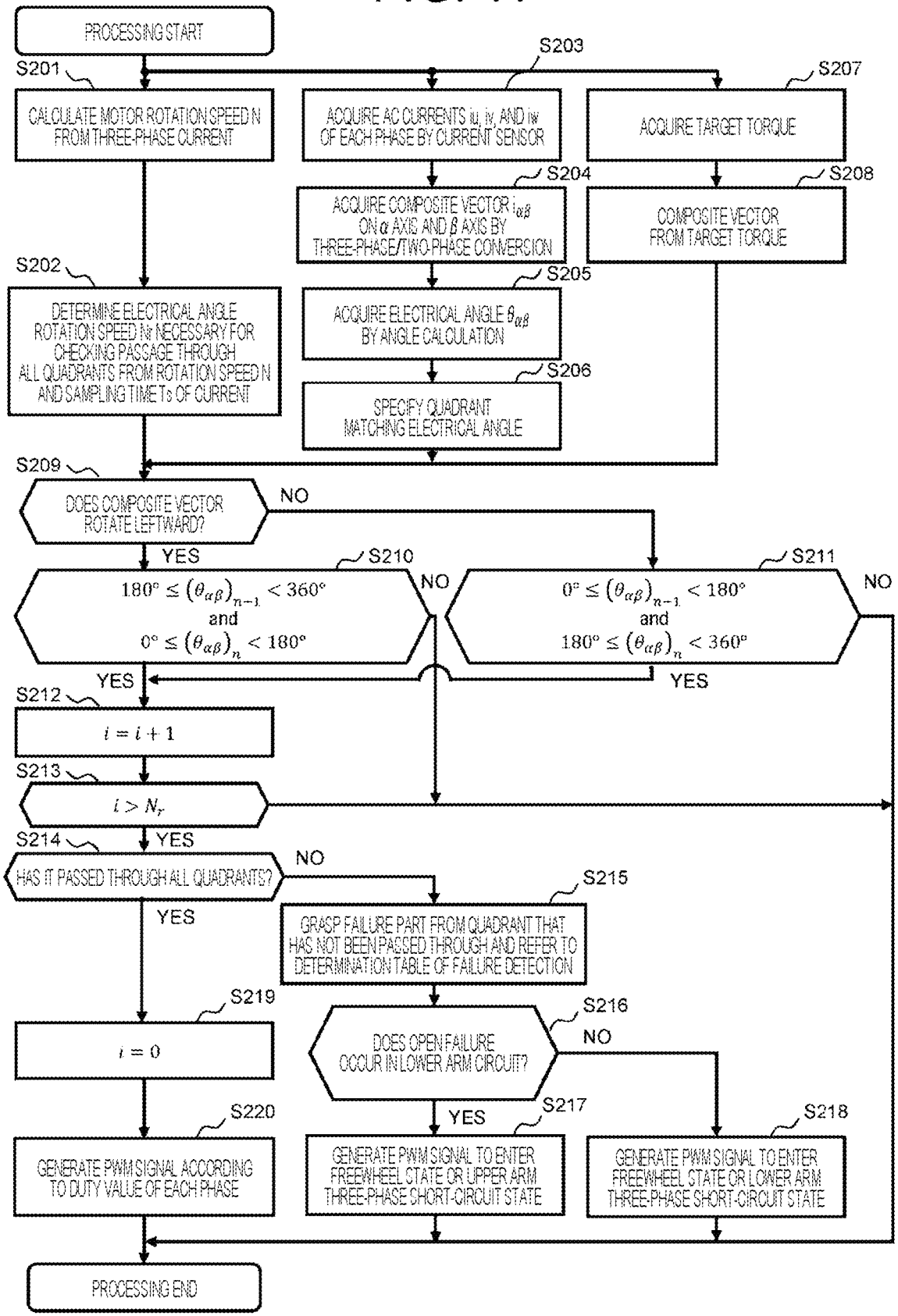
FIG. 11 is a flowchart illustrating an operation of a control unit in the second embodiment.

FIG. 11 is a flowchart illustrating an operation of the control unit 40' in the second embodiment.

In Step S201 of FIG. 11, the motor rotation speed calculation unit 82 calculates the motor rotation speed N from the three-phase AC currents iu, iv, and iw. In the next Step S202, the required rotation speed calculation unit 83 determines the electrical angle rotation speed Nr necessary for confirming passage of all quadrants from the rotation speed N and the current sampling time Ts. For example, the required rotation speed calculation unit 83 prepares a correspondence table of the motor rotation speed N, the sampling time Ts of the current sensor, and the electrical angle rotation speed Nr necessary for checking passage through all quadrants, and outputs the corresponding electrical angle rotation speed Nr from the motor rotation speed N based on the calculation result of the motor rotation speed calculation unit 82 with reference to the correspondence table.

In Step S203 of FIG. 11, the current detection unit acquires the AC currents iu, iv, and iw of the respective phases. In the next Step S204, the three-phase/two-phase conversion unit 43 acquires the composite vector $i_{\alpha\beta}$ on the α axis and the β axis. In the next Step S205, the electrical angle calculation unit 44 obtains the electrical angle of the composite vector $i_{\alpha\beta}$ with reference to the U-phase AC current iu. Then, in Step S206, the quadrant calculation unit 45 outputs quadrant information indicating which quadrant of the first quadrant to the sixth quadrant partitioned in advance the acquired electrical angle corresponds to.

Further, in Step S207 of FIG. 11, the composite vector rotation direction calculation unit 81 acquires the target torque of the motor 20 from the external electronic control device. Then, in Step S208, the composite vector rotation direction calculation unit 81 calculates the rotation direction of the composite vector from the target torque and outputs the rotation direction to the failure detection unit 47.

In Step S209, the failure detection unit 47 determines whether the composite vector rotates leftward.

If the rotation is the left rotation, the process proceeds to Step S210, and if the rotation is the right rotation, the process proceeds to Step S211. In Steps S210 and S211, the acquired angle is represented as $(\theta_{\alpha\beta})n$, and the previous acquired angle is represented as $(\theta_{\alpha\beta})n-1$.

In Step S210, it is determined whether the angle of the composite vector satisfies the condition of the following Expression (9) with reference to the α axis.

[Math. 9]

$$180° \leq (\theta_{\alpha\beta})_{n-1} < 360° \text{ and } 0° \leq (\theta_{\alpha\beta})_n < 180° \tag{9}$$

In Step S211, it is determined whether the angle of the composite vector satisfies the condition of the following Expression (10) with reference to the α axis.

[Math. 10]

$$0° \leq (\theta_{\alpha\beta})_{n-1} < 180° \text{ and } 180° \leq (\theta_{\alpha\beta})_n < 360° \tag{9}$$

In a case where it is determined in Step S210 and Step S211 that the condition is satisfied, the process proceeds to Step S212, and in a case where it is determined that the condition is not satisfied, the process is ended. In Step S212, 1 is added to i. Then, in the next Step S213, it is determined whether i is larger than the electrical angle rotation speed Nr.

For example, in the counterclockwise example of the composite vector, in a case where the composite vector moves from the negative side (right side) to the positive side (left side) of the α axis in Step S210, it can be said that the composite vector has passed the 0° point. Therefore, the counter i is added in Step S212, and it is confirmed in Step S213 whether the required rotation speed Nr has been obtained. In the clockwise example of the composite vector, since it can be said that the composite vector has passed the 0° point when the composite vector moves from the positive side (left side) to the negative side (right side) of the α axis in Step S211, the counter i is added in Step S212, and it is confirmed in Step S213 whether the required rotation speed Nr has been obtained.

In a case where it is determined in Step S213 that i is larger than the electrical angle rotation speed Nr, it is a case where the composite vector has passed through all the quadrants, and the process proceeds to Step S214. In a case where it is not determined in Step S213 that i is larger than the electrical angle rotation speed Nr, the process is ended, and the processing illustrated in FIG. 11 is repeated after a predetermined time elapses.

In Step S214, the failure detection unit 47 determines whether the quadrant information output in Step S206 corresponds to all the quadrants, that is, whether all the quadrants have been passed through. If all the quadrants have not been passed, the process proceeds to Step S215.

In Step S215, the failure detection unit 47 considers that it is a failure state, specifies a failure part with reference to a determination table stored in advance in the memory 46 and the quadrant that has not been passed, and outputs failure information to the host control device and the PWM signal generation unit 42. Note that the determination table is similar to the determination table of failure detection in the first embodiment illustrated in FIG. 7.

In Step S216, it is determined whether the open failure occurs in the lower arm circuit. In a case where the open failure of the lower arm circuit occurs in Step S216, the PWM signal generation unit 42 generates and outputs a PWM signal to be in the upper arm three-phase short-circuit state in Step S217. As a result, the inverter circuit 60 enters the upper arm active short state. Alternatively, in Step S217, all the six switching elements in the inverter circuit 60 are turned off to enter a freewheel state.

On the other hand, in a case where the open failure occurs in the upper arm circuit, in Step S218, the PWM signal generation unit 42 generates and outputs a PWM signal to be in the lower arm three-phase short-circuit state. As a result, the inverter circuit 60 enters the lower arm active short state. Alternatively, in Step S218, all the six switching elements in the inverter circuit 60 are turned off to enter a freewheel state.

After the processing of Steps S217 and S218, the process illustrated in FIG. 11 is ended.

When it is determined in Step S214 that in the quadrant information output in Step S206, all the quadrants have been passed through, the failure detection unit 47 determines that the inverter circuit 60 is normal and the process proceeds to Step S219. In Step S219, the counter i is returned to 0. Then, in Step S220, the PWM signal generation unit 42 generates a PWM signal according to the duty value of each phase. Then, after a predetermined time has elapsed, the processes illustrated in FIG. 11 are repeated.

According to the present embodiment, in order to detect the failure using the electrical angle, it is possible to detect the failure of the switching element with high accuracy using only the current value of the three-phase AC current regardless of the amplitude accuracy of the three-phase AC current value.

In addition, from the relationship between the acquisition timing of the three-phase current value and the rotation speed of the motor 20, even in a case where it is not possible to acquire the electrical angle of the composite vector such that the composite vector passes through all the quadrants within one rotation of the electrical angle, according to the present embodiment, it is possible to detect the failure of the switching element when the composite vector passes through all the quadrants within a plurality of rotations of the electrical angle.

Third Embodiment

Figure 12:
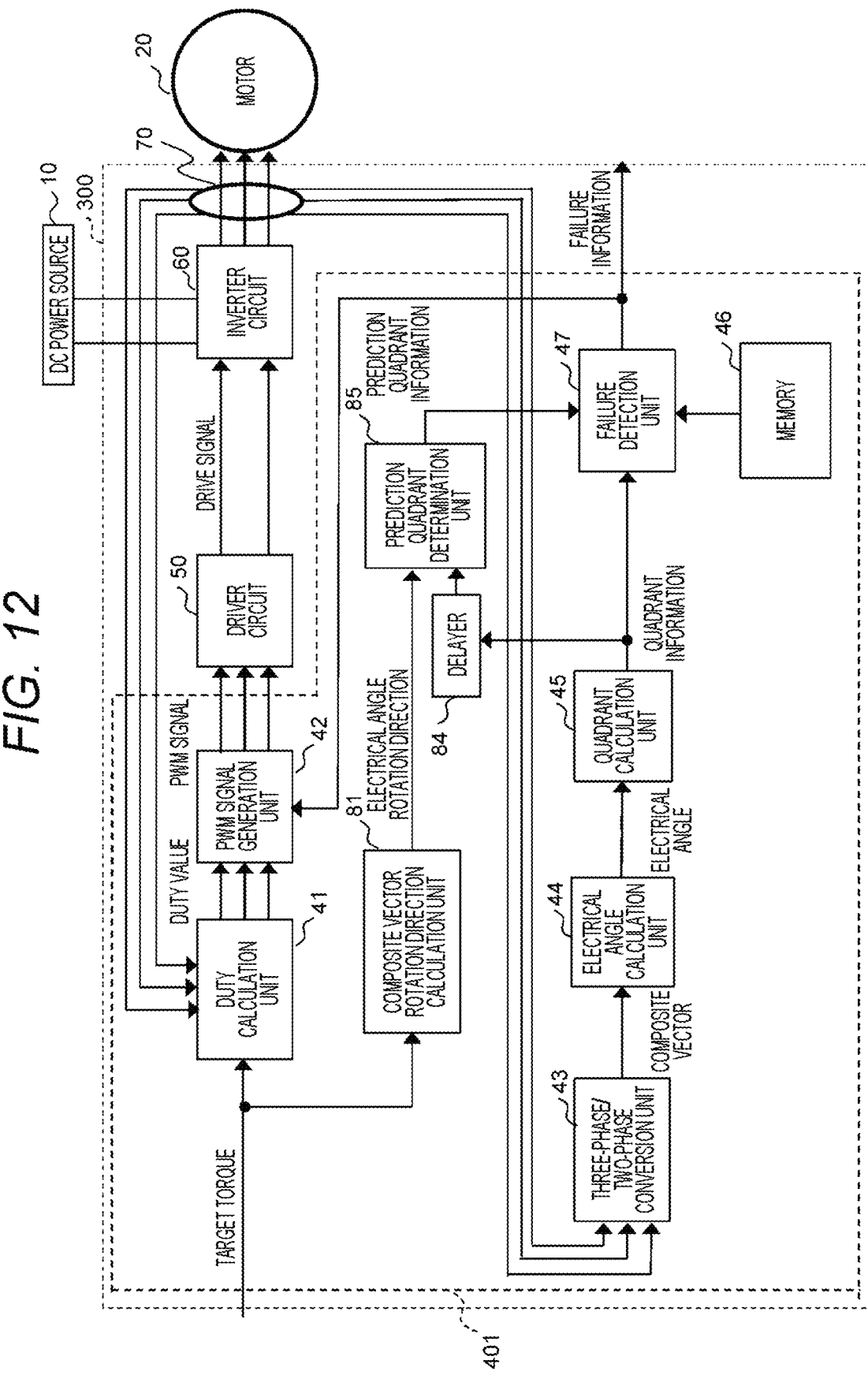
FIG. 12 is a circuit configuration diagram of a power conversion apparatus according to a third embodiment.

FIG. 12 is a circuit configuration diagram of a power conversion apparatus 300 in the present embodiment.

The same portions as those of the power conversion apparatus 100 in the first embodiment illustrated in FIG. 1 are denoted by the same reference numerals, and the description thereof will be omitted. In the third embodiment, the failure part is determined from the position of the missing quadrant, but in the present embodiment, the quadrant starting to be missing is specified, and the failure part is determined early.

A control unit 40″ includes the composite vector rotation direction calculation unit 81, a delayer 84, and a prediction quadrant determination unit 85 in addition to the duty calculation unit 41, the PWM signal generation unit 42, the three-phase/two-phase conversion unit 43, the electrical angle calculation unit 44, the quadrant calculation unit 45, the memory 46, and the failure detection unit 47.

The composite vector rotation direction calculation unit 81 acquires the target torque of the motor 20 from an electronic control device (not illustrated) provided outside the power conversion apparatus 300, calculates the rotation direction of the composite vector from the target torque, and outputs the rotation direction to the prediction quadrant determination unit 85.

The delayer 84 delays the quadrant information from the quadrant calculation unit 45 by one sample and passes the information to the prediction quadrant determination unit 85.

The prediction quadrant determination unit 85 outputs the prediction quadrant information to the failure detection unit 47 based on the quadrant information one sample before obtained through the delayer 84 and the rotation direction of the composite vector.

Note that each component in the control unit 40″ may implement the function of each component by a CPU and a program represented by a flowchart illustrated in FIG. 15 to be described later, regardless of the configuration by hardware. In a case where each configuration in the control unit 40″ is realized by the CPU and the program, there is an advantage that the cost can be reduced because the number of pieces of hardware is reduced. On the other hand, in a case where each configuration is configured by hardware independent of the control unit 40″, there is an advantage that the processing load of the control unit 40″ is reduced and the diagnosis processing can be speeded up.

Figures 13, 14:
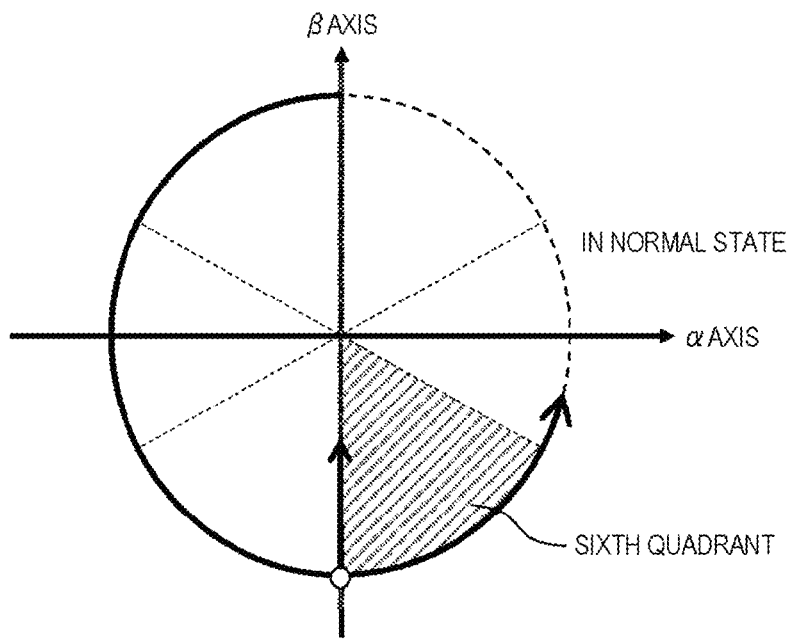
FIG. 13 is a diagram illustrating a case where an open failure occurs in the U-phase upper arm circuit which is a composite vector in the αβ-axis coordinate space.

FIG. 13 is a diagram illustrating a case where an open failure occurs in the U-phase upper arm circuit which is a composite vector in the αβ-axis coordinate space.

FIG. 13 illustrates a situation in which the composite vector rotates counterclockwise. When an open failure occurs in the U-phase upper arm circuit, the rotation locus of the composite vector changes to a semicircle indicated by a solid line in FIG. 13. That is, the position of the quadrant in which the sixth quadrant is first omitted is obtained.

FIG. 14 is a diagram illustrating a determination table of failure detection according to the present embodiment.

The determination table illustrated in FIG. 14 illustrates a case where the composite vector is counterclockwise, and this determination table is stored in the memory 46 in advance. As illustrated in FIG. 14, the determination angular range and the failure missing order are stored in association with the determination areas of the first quadrant to the sixth quadrant.

As illustrated in FIG. 14, the failure missing order in a case where the U-phase upper arm circuit fails is the order of the sixth quadrant, the first quadrant, and the second quadrant. The failure missing order when the U-phase lower arm circuit fails is the order of the third quadrant, the fourth quadrant, and the fifth quadrant. The failure missing order when the V-phase upper arm circuit fails is the order of the second quadrant, the third quadrant, and the fourth quadrant. The failure missing order when the V-phase lower arm circuit fails is the order of the fifth quadrant, the sixth quadrant, and the first quadrant. The failure missing order when the W-phase upper arm circuit fails is the order of the fourth quadrant, the fifth quadrant, and the sixth quadrant. The failure missing order when the W-phase lower arm circuit fails is the order of the first quadrant, the second quadrant, and the third quadrant.

FIG. 15 is a flowchart illustrating an operation of the control unit 40″ in the third embodiment.

In Step S301 of FIG. 15, it is determined whether the maximum motor rotation speed Nmax [rpm] is less than $60/6\, t_s$. Note that the processing of Steps S301 to S306 is similar to the processing of Steps S101 to S106 illustrated in FIG. 8 described in the first embodiment, and thus the description thereof will be simplified.

When the condition illustrated in Step S301 is not satisfied, the rotation speed of the motor 20 is too high. Therefore, the process proceeds to Step S302, and the host control device is notified that the failure diagnosis is not valid.

In Step S303, the current detection unit 70 acquires the AC currents iu, iv, and iw of the respective phases.

In the next Step S304, the three-phase/two-phase conversion unit 43 acquires the composite vector $i_{\alpha\beta}$ on the α axis and the β axis.

In Step S305, the electrical angle calculation unit 44 obtains the electrical angle of the composite vector $i_{\alpha\beta}$ with reference to the U-phase AC current iu. Then, in Step S306, the quadrant calculation unit 45 outputs quadrant information indicating which quadrant of the first quadrant to the sixth quadrant partitioned in advance the acquired electrical angle corresponds to.

In Step S307, the quadrant information from the quadrant calculation unit 45 is input to the delayer 84, and a delay corresponding to one sample is performed.

In Step S308, the composite vector rotation direction calculation unit 81 acquires the target torque of the motor 20. Then, in Step S309, the composite vector rotation direction calculation unit 81 calculates the rotation direction of the composite vector from the target torque and outputs the rotation direction to the prediction quadrant determination unit 85.

Next, in Step S310, the prediction quadrant determination unit 85 determines prediction quadrant information by combining the rotation direction of the composite vector and the quadrant information delayed by the delayer 84, and outputs the prediction quadrant information to the failure detection unit 47. In the example of FIG. 13, that is, in the example in which the composite vector is counterclockwise and the U-phase upper arm circuit has an open failure, when the current time point is the sampling time point of the fifth quadrant, the information of the sixth quadrant is output to the failure detection unit 47 as the prediction quadrant information.

In Step S311, the failure detection unit 47 compares the prediction quadrant information obtained by the prediction quadrant determination unit 85 with the current quadrant information. In Step S312, the failure detection unit 47 determines whether the prediction quadrant information matches the current quadrant information. In the example of FIG. 13, the passing sixth quadrant at the current time point is missing, and in Step S312, it is determined that the prediction quadrant information does not match the sixth quadrant as the prediction quadrant information (the quadrant to be passed next to the fifth quadrant that has passed one time before), and the process proceeds to Step S313.

In Step S313, the failure detection unit 47 considers that it is a failure state, specifies a failure part with reference to the failure missing order in the determination table in the memory 46, and outputs failure information to the host control device and the PWM signal generation unit 42. In the example of FIG. 14, if the upper arm circuit of the U phase having the first failure missing order in the sixth quadrant is an open failure, the failure part is specified.

In Step S314, it is determined whether the open failure occurs in the lower arm circuit. In a case where the open failure occurs in the lower arm circuit, in Step S315, the PWM signal generation unit 42 generates and outputs a PWM signal to be in the upper arm three-phase short-circuit state. As a result, the inverter circuit 60 enters the upper arm active short state.

On the other hand, in a case where the open failure occurs in the upper arm circuit in Step S314, the PWM signal generation unit 42 generates and outputs a PWM signal to be in the lower arm three-phase short-circuit state in Step S316. As a result, the inverter circuit 60 enters the lower arm active short state.

After the processing of Steps S315 and S316, the process illustrated in FIG. 15 is ended.

In Step S312, when it is determined that the prediction quadrant information matches the current quadrant information, the failure detection unit 47 determines that the previously passed quadrant and the currently passed quadrant are not missing and the inverter circuit 60 is in a normal state, and the process proceeds to Step S317. In Step S317, the PWM signal generation unit 42 generates a PWM signal according to the duty value of each phase. Then, after a predetermined time has elapsed, the processes illustrated in FIG. 15 are repeated.

Note that the quadrant information is delayed by one sample and compared with the quadrant information of one previous sample, but the quadrant information may be delayed by two samples and compared with the quadrant information of two previous samples. As a result, even in a case where quadrant information one sample before is in a transition period and is ambiguous, it is possible to reliably capture a missing quadrant by using quadrant information two samples before.

According to the present embodiment, in order to detect the failure using the electrical angle, it is possible to detect the failure of the switching element with high accuracy using only the current value of the three-phase AC current regardless of the amplitude accuracy of the three-phase AC current value.

In addition, according to the present embodiment, it is possible to specify the failure part at an early stage without waiting for the composite vector to rotate by one electrical angle.

(Modification 1)

FIG. 16 is a diagram illustrating a quadrant of a composite vector in an αβ-axis coordinate space in Modification 1.

Numbers in FIG. 16 indicate quadrant numbers. As illustrated in FIG. 16, a predetermined quadrant in the αβ-axis coordinate space is partitioned into the first to sixth quadrants by, for example, (1) the β axis, (2) a straight line inclined by 60° with respect to the β axis, and (3) a straight line inclined by 120° with respect to the β axis. Quadrants in the vicinity of the boundary indicated by numeral 7 are defined at the boundary of the respective quadrants. As a result, in order to prevent erroneous recognition of the quadrant through which the rotating composite vector has passed, the vicinity of the boundary of the quadrant is set as another quadrant.

FIG. 17 is a diagram illustrating a determination table of failure detection in Modification 1.

As illustrated in FIG. 17, the determination angular range and the failure part are stored in association with each of the first quadrant to the sixth quadrant and the determination areas in the vicinity of the boundary. Symbols in the drawing represent numbers in the drawing in FIG. 16. α in the determination angular range represents an angular range in the vicinity of the boundary.

In the determination angular range of the first quadrant, the center is 0 degrees, the minimum is 330+α degrees, and the maximum is 30−α degrees. When the failure part is the U-phase upper arm circuit, the V-phase lower arm circuit, or the W-phase lower arm circuit, a cross mark indicates that the composite vector $i_{\alpha\beta}$ does not pass through the first quadrant.

In the determination angular range of the second quadrant, the center is 60 degrees, the minimum is 30+α degrees, and the maximum is 90−α degrees. When the failure part is the U-phase upper arm circuit, the V-phase upper arm circuit, or the W-phase lower arm circuit, a cross mark indicates that the composite vector $i_{\alpha\beta}$ does not pass through the second quadrant.

Also similarly in the third quadrant to the sixth quadrant, in the determination table illustrated in FIG. 17, a circle mark indicates a quadrant through which the composite vector passes, and a cross mark indicates a quadrant through which the composite vector does not pass at the failure part.

In the vicinity of the boundary, six subdivisions with a minimum to a maximum of 30−α to 30+α, 90−α to 90+α, 150−α to 150+α, 210−α to 210+α, 270−α to 270+α, and 330−α to 330+α are defined.

The quadrant calculation unit 45 described in the first to third embodiments outputs quadrant information of any one of the first to sixth quadrants and the vicinity of the boundary.

The failure detection unit 47 described in the first to third embodiments outputs failure information with reference to a determination table stored in the memory 46 or the like. In this case, the failure determination is not performed in the vicinity of the boundary.

(Modification 2)

FIG. 18 is a diagram illustrating a quadrant of a composite vector in an αβ-axis coordinate space in Modification 2.

Numbers in FIG. 18 indicate quadrant numbers. As illustrated in FIG. 18, a predetermined quadrant in the αβ-axis coordinate space is partitioned into the first to sixth quadrants by, for example, (1) the β axis, (2) α straight line inclined by 60° with respect to the β axis, and (3) a straight line inclined by 120° with respect to the β axis. Quadrants in the vicinity of the boundary indicated by numeral 7 to 12 are defined at the boundary of the respective quadrants. As a result, in order to prevent erroneous recognition of the quadrant through which the rotating composite vector has passed, the vicinity of the boundary of the quadrant is set as another quadrant.

FIG. 19 is a diagram illustrating a determination table of failure detection in Modification 2.

As illustrated in FIG. 19, the determination angular range and the failure part are stored in association with each of the first quadrant to the sixth quadrant and the determination areas in the vicinity of the boundary. Symbols in the drawing represent numbers in the drawing in FIG. 18. α in the determination angular range represents an angular range in the vicinity of the boundary.

In the determination angular range of the first quadrant, the center is 0 degrees, the minimum is 330+α degrees, and the maximum is 30−α degrees. When the failure part is the U-phase upper arm circuit, the V-phase lower arm circuit, or the W-phase lower arm circuit, a cross mark indicates that the composite vector $i_{\alpha\beta}$ does not pass through the first quadrant.

In the determination angular range of the second quadrant, the center is 60 degrees, the minimum is 30+α degrees, and the maximum is 90−α a degrees. When the failure part is the U-phase upper arm circuit, the V-phase upper arm circuit, or the W-phase lower arm circuit, a cross mark indicates that the composite vector $i_{\alpha\beta}$ does not pass through the second quadrant. Also similarly in the third quadrant to the sixth quadrant, in the determination table illustrated in FIG. 19, a circle mark indicates a quadrant through which the composite vector passes, and a cross mark indicates a quadrant through which the composite vector does not pass at the failure part.

In the vicinities of the boundaries 7 to 12, six subdivisions with a minimum to a maximum of 30−α to 30+α, 90−α to 90+α, 150−α to 150+α, 210−α to 210+α, 270−α to 270+α, and 330−α to 330+α are defined.

In the determination table illustrated in FIG. 19, in correspondence with the vicinities of the boundaries 7 to 12, a circle mark indicates an area through which the composite vector passes, a cross mark indicates an area through which the composite vector does not pass at a failure part, and a minus mark indicates an area in which the failure determination is not performed. For example, the vicinity of the boundary 7 has a center of 30 degrees, a minimum of 30−α degrees, and a maximum of 30+α degrees. When the failure part is the U-phase upper arm circuit or the W-phase lower arm circuit, a cross mark indicates that the composite vector $i_{\alpha\beta}$ does not pass through the vicinity of the boundary 7. In the vicinity of the boundary 7, the V-phase upper arm circuit and the V-phase lower arm circuit do not determine failure.

The quadrant calculation unit 45 described in the first to third embodiments outputs quadrant information of any one of the first to sixth quadrants and the vicinity of the boundary.

The failure detection unit 47 described in the first to third embodiments outputs failure information with reference to a determination table stored in the memory 46 or the like. In this case, for the vicinities of the boundaries 7 to 12, the determination is performed assuming that the vicinity of the boundary 7 is the first quadrant or the second quadrant, the vicinity of the boundary 8 is the second quadrant or the third quadrant, the vicinity of the boundary 9 is the third quadrant or the fourth quadrant, the vicinity of the boundary 10 is the fourth quadrant or the fifth quadrant, the vicinity of the boundary 11 is the fifth quadrant or the sixth quadrant, and the vicinity of the boundary 12 is the sixth quadrant or the first quadrant.

(Modification 3)

FIG. 20 is a diagram illustrating a quadrant of a composite vector in an αβ-axis coordinate space in Modification 3.

Numbers in FIG. 20 indicate quadrant numbers. As illustrated in FIG. 20, the αβ-axis coordinate space including the α axis that coincides with the direction of the current of any phase and the β axis orthogonal to the α axis is partitioned into a first to sixth quadrants by a predetermined quadrant on the α axis and the β axis, for example, (1) a straight line inclined by 30° with respect to the β axis, (2) a straight line inclined by 90° with respect to the β axis, and (3) a straight line inclined by 150° with respect to the β axis. A dotted line in FIG. 20 indicates the boundary of the quadrant. It is inclined counterclockwise by 30° with respect to the quadrant setting illustrated in FIG. 6 of the first embodiment.

FIG. 21 is a diagram illustrating a determination table of failure detection in Modification 3.

The determination table illustrated in FIG. 21 is stored in the memory 46 in advance. As illustrated in FIG. 21, the determination angular range and the failure part are stored in association with the determination areas of the first quadrant to the sixth quadrant.

The determination angular range in the first quadrant has a center of 30 degrees, a minimum of 0 degrees, and a maximum of 60 degrees. When the failure part is the U-phase upper arm circuit or the W-phase lower arm circuit, the composite vector $i_{\alpha\beta}$ does not pass through the first quadrant is indicated by a cross mark.

The determination angular range in the second quadrant has a center of 90 degrees, a minimum of 60 degrees, and a maximum of 120 degrees. Then, in a case where the failure part is the V-phase upper arm circuit or the W-phase lower arm circuit, a cross mark indicates that the composite vector $i_{\alpha\beta}$ does not pass through this second quadrant.

Also similarly in the third quadrant to the sixth quadrant, in the determination table illustrated in FIG. 21, a circle mark indicates a quadrant through which the composite vector passes, and a cross mark indicates a quadrant through which the composite vector does not pass at the failure part.

The failure detection unit 47 determines whether the composite vector has rotated from the first quadrant to the sixth quadrant by at least one electrical angle. Then, when there is a quadrant that has not been passed on the basis of the quadrant information from the quadrant calculation unit 45, the failure detection unit 47 considers that it is a failure state, specifies a failure part on the basis of the determination table in the memory 46, and outputs the failure information. For example, the failure detection unit 47 determines that the U-phase upper arm circuit has failed when the composite vector has not passed through the area indicated by hatching in FIG. 20 (a section having a width of ±60° around the α axis).

According to Modification 3, even when the composite vector indicates the vicinity of the boundary described in FIG. 18, it is possible to avoid ambiguity of failure detection.

According to the above embodiment, the following operational effects are obtained.

(1) The power conversion apparatuses 100, 200, and 300 include the inverter circuit 60 that is configured by a switching element and configured to convert a DC current into an AC current, the current detection unit 70 that detects three-phase output currents of the inverter circuit 60, and the control units 40, 40', and 40" that specify that an open failure has occurred in the switching element of the inverter circuit 60 in a phase corresponding to a predetermined range when the electrical angle of the composite vector $i_{\alpha\beta}$ calculated from the three-phase output currents detected by the current detection unit 70 are not included in the predetermined range. As a result, the failure of the switching element can be detected with high accuracy without being affected by the magnitude of the output current of each phase.

(2) A method for diagnosing a failure of the power conversion apparatuses 100, 200, and 300 detects three-phase output currents of the inverter circuit 60 configured by a switching element and configured to convert a DC current into an AC current, and specifies that an open failure has occurred in the switching element of the inverter circuit 60 in a phase corresponding to a predetermined range when the electrical angle of the composite vector $i_{\alpha\beta}$ calculated from the detected three-phase output currents are not included in the predetermined range. As a result, the failure of the switching element can be detected with high accuracy without being affected by the magnitude of the output current of each phase.

The invention is not limited to the above embodiments, and includes other forms considered within the scope of the technical ideas of the invention as long as the features of the invention are not degraded. In addition, the above embodiments and the plurality of modifications may be combined.

REFERENCE SIGNS LIST

10 DC power source
20 motor
40, 40', 40" control unit
41 duty calculation unit
42 PWM signal generation unit
43 three-phase/two-phase conversion unit
44 electrical angle calculation unit
45 quadrant calculation unit
46 memory
47 failure detection unit
50 driver circuit
60 inverter circuit
70 current detection unit
81 composite vector rotation direction calculation unit
82 motor rotation speed calculation unit
83 required rotation speed calculation unit
84 delayer
85 prediction quadrant determination unit
100, 200, 300 power conversion apparatus

The invention claimed is:

1. A power conversion apparatus comprising:
an inverter circuit configured by a switching element and configured to convert a DC current into an AC current;
a current detection unit configured to detect three-phase output currents of the inverter circuit; and
a control unit that, when an electrical angle of a composite vector calculated from the three-phase output currents detected by the current detection unit is not included in a predetermined range, specifies that an open failure has occurred in a switching element of the inverter circuit in a phase corresponding to the predetermined range.

2. The power conversion apparatus according to claim 1, wherein
the control unit determines which quadrant of a first quadrant to a sixth quadrant divided in units of 60° of the electrical angle the composite vector passes through in the first quadrant to the sixth quadrant, thereby specifying the phase of the inverter circuit having the open failure.

3. The power conversion apparatus according to claim 2, wherein
the control unit includes a determination table that stores a determination angular range of the electrical angle and a failure part in association with each determination area of the first quadrant to the sixth quadrant, and
the control unit specifies a phase of the inverter circuit in which the open failure occurs with reference to the determination table.

4. The power conversion apparatus according to claim 2, wherein
the control unit determines the electrical angle necessary for checking passage through all the quadrants from the first quadrant to the sixth quadrant from a motor rotation speed and a current sampling time by the current detection unit, and specifies the open failure when a rotation is made to the determined electrical angle.

5. The power conversion apparatus according to claim 2, wherein
the control unit specifies the open failure based on a passed quadrant and a previously passed quadrant.

6. The power conversion apparatus according to claim 5, wherein
the control unit specifies the open failure based on a passed quadrant and a precedingly passed quadrant.

7. The power conversion apparatus according to claim 2, wherein
the control unit defines a vicinity of each boundary of the first quadrant to the sixth quadrant, and does not specify the open failure when the composite vector passes the vicinity of the boundary.

8. The power conversion apparatus according to claim 2, wherein
the control unit partitions, as the first quadrant to the sixth quadrant, an αβ-axis coordinate space including an α axis coinciding with a direction of a current of any phase and a β axis orthogonal to the α axis by (1) the β axis, (2) a straight line inclined by 60° with respect to the β axis, and (3) a straight line inclined by 120° with respect to the β axis.

9. The power conversion apparatus according to claim 2, wherein
the control unit partitions, as the first quadrant to the sixth quadrant, an αβ-axis coordinate space including an α axis coinciding with a direction of a current of any phase and a β axis orthogonal to the α axis by (1) a straight line inclined by 30° with respect to the β axis, (2) a straight line inclined by 90° with respect to the β axis, and (3) a straight line inclined by 150° with respect to the β axis.

10. The power conversion apparatus according to claim 1, wherein
the control unit includes a PWM signal generation unit that generates a PWM signal and supplies the PWM signal to the inverter circuit, and
the PWM signal generation unit controls the PWM signal such that a motor connected to the inverter circuit is not driven when the open failure is specified.

11. The power conversion apparatus according to claim 1, wherein
the current detection unit performs current detection in a sampling period of at least six points of a fundamental wave component of the output current during a period of one cycle.

12. The power conversion apparatus according to claim 1, wherein
the current detection unit performs current detection at a sampling frequency that is at least six times or more a frequency of the output current.

13. A method for diagnosing a failure for a power conversion apparatus, comprising:
detecting three-phase output currents of an inverter circuit that is configured by a switching element and configured to convert a DC current into an AC current;
specifying, when an electrical angle of a composite vector calculated from the detected three-phase output currents of the three phases is not included in a predetermined range, that an open failure has occurred in a switching element of the inverter circuit in a phase corresponding to the predetermined range.

14. The method for diagnosing a failure for a power conversion apparatus according to claim 13, wherein
in the specifying of the open failure, the open failure is specified by determining which quadrant of the first quadrant to the sixth quadrant divided in units of 60° of the electrical angle the composite vector passes through in the first quadrant to the sixth quadrant.

* * * * *